(12) United States Patent
Le et al.

(10) Patent No.: US 12,418,571 B2
(45) Date of Patent: Sep. 16, 2025

(54) METHOD AND ELECTRONIC APPARATUS FOR FORWARDING CALL FROM SENDING ELECTRONIC APPARATUS

(71) Applicant: Samsung Electronics Co., Ltd., Suwon-si (KR)

(72) Inventors: Van Bang Le, Bac Ninh (VN); Anh Tuan Le, Bac Ninh (VN); Dinh Quan Vuong, Bac Ninh (VN); Van Thong Duong, Bac Ninh (VN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/414,800

(22) Filed: Jan. 17, 2024

(65) Prior Publication Data
US 2024/0244095 A1    Jul. 18, 2024

(30) Foreign Application Priority Data

Jan. 18, 2023 (KR) .................. 10-2023-0007175
Jan. 30, 2023 (KR) .................. 10-2023-0011873

(51) Int. Cl.
*H04L 65/1096* (2022.01)
*H04L 65/1069* (2022.01)
*H04L 65/1104* (2022.01)

(52) U.S. Cl.
CPC ...... *H04L 65/1096* (2013.01); *H04L 65/1069* (2013.01); *H04L 65/1104* (2022.05)

(58) Field of Classification Search
CPC ............. H04L 65/1069; H04L 65/1096; H04L 65/1104

(Continued)

(56) References Cited

U.S. PATENT DOCUMENTS

| 7,095,838 B1 | 8/2006 | Kanerva et al. |
| 7,860,230 B2 * | 12/2010 | Martin ............. H04W 4/12 379/212.01 |

(Continued)

FOREIGN PATENT DOCUMENTS

| KR | 10-2411394 B1 | 6/2022 |
| WO | 2020/076344 A1 | 4/2020 |

*Primary Examiner* — Glenford J Madamba
(74) *Attorney, Agent, or Firm* — Jefferson IP Law, LLP

(57) ABSTRACT

A first electronic device and a method for forwarding a call from a second electronic device are provided. A first electronic device includes a transceiver, memory storing instructions, and one or more processors configured to execute the instructions to receive from a server a first session initiation protocol (SIP) invite message generated at the second electronic device, through the transceiver, determine whether to forward the call from the second electronic device, in response to receiving the first SIP invite message, upon determining to forward the call from the second electronic device, obtain contact information related to the call forwarding from the second electronic device, generate a response message comprising the contact information related to the call forwarding, and transmit the response message to the server to provide the response message comprising the contact information from the server to the second electronic device through the transceiver, wherein the contact information in the response message transmitted to the server is used by the server to generate a second SIP invite message to be transmitted to the third electronic device.

20 Claims, 15 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 8,094,800 | B1* | 1/2012 | Smith | ............... H04M 3/42059 |
| | | | | 379/211.01 |
| 11,683,411 | B1* | 6/2023 | Koster | ............... H04M 3/42034 |
| | | | | 379/266.07 |
| 2009/0067606 | A1 | 3/2009 | Li | |
| 2013/0102298 | A1 | 4/2013 | Goodman et al. | |
| 2017/0163803 | A1* | 6/2017 | Russell | ............... H04L 65/1016 |
| 2017/0324870 | A1 | 11/2017 | Cao et al. | |
| 2021/0203700 | A1* | 7/2021 | Asveren | ............... H04L 65/1069 |
| 2022/0094548 | A1* | 3/2022 | Asveren | ................ H04L 9/3213 |
| 2022/0272190 | A1 | 8/2022 | Gayaldo | |

* cited by examiner

```
SIP/2.0 SIP RESPONSE
  Via: SIP/2.0/TLS
client.biloxi.example.com:5061;branch=z9hG4bKnashd92
   ;received=192.0.2.201
  From: Bob <sips:bob@biloxi.example.com>;tag=ja743ks76zlflH
  To: Bob <sips:bob@biloxi.example.com>;tag=37GkEhwl6
  Call-ID: 1j9FpLxk3uxtm8tn@biloxi.example.com
  CSeq: 2 REGISTER
  Contact: <sips:bob@client.biloxi.example.com>;expires=3600
  Content-Length: 0
  Call-info: "block_status: true","contactA","contactB","contactC"
```

FIG.8

```
SIP/2.0 SIP INVITE
  Via: SIP/2.0/TLS
client.biloxi.example.com:5061;branch=z9hG4bKnashd92
  ;received=192.0.2.201
  From: Bob <sips:bob@biloxi.example.com>;tag=ja743ks76zlflH
  To: Bob <sips:bob@biloxi.example.com>;tag=37GkEhwl6
  Call-ID: 1j9FpLxk3uxtm8tn@biloxi.example.com
  CSeq: 2 REGISTER
  Contact: <sips:bob@client.biloxi.example.com>;expires=3600
  Content-Length: 0
  Call-info: "block_status: true","contactA","contactB","contactC"
```

FIG.9

METHOD AND ELECTRONIC APPARATUS FOR FORWARDING CALL FROM SENDING ELECTRONIC APPARATUS

CROSS-REFERENCE TO RELATED APPLICATION(S)

This application is based on and claims priority under 35 U.S.C. § 119(a) of a Korean patent application number 10-2023-0007175, filed on Jan. 18, 2023, in the Korean Intellectual Property office and of a Korean patent application number 10-2023-0011873, filed on Jan. 30, 2023, in the Korean Intellectual Property Office, the disclosure of each of which is incorporated by reference herein in its entirety.

BACKGROUND

1. Field

The disclosure relates to an electronic device and a method for forwarding a call from a calling electronic device. More particularly, the disclosure relates to an electronic device and a method for forwarding a call based on a response message including contact information.

2. Description of Related Art

In recent, a communication technology for providing a service to a user using voice and data advances, and a user may use a call service between users based on various multimedia data. However, if the user forwards an incoming call from a called electronic device to another called electronic device, a conventional call service has difficulty in effectively providing call forwarding information to a calling electronic device and the another called electronic device and managing the electronic devices related to the call forwarding.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above mentioned problems and/or disadvantages and to provide at least the advantages described below. Accordingly, an aspect of the disclosure is to provide an electronic device and a method for forwarding a call based on a response message including contact information.

Additional aspects will be set forth in part in the description which follows and, in part, will be apparent from the description, or may be learned by practice of the presented embodiments.

In accordance with an aspect of the disclosure, a first electronic device (ex: a called electronic device) for forwarding a call from a second electronic device (ex: a calling electronic device) to third electronic device (ex: another called electronic device) is provided. A first electronic device includes a transceiver, memory storing instructions, and one or more processors configured to execute the instructions to receive from a server a first session initiation protocol (SIP) invite message generated at the second electronic device, through the transceiver, determine whether to forward the call from the second electronic device, in response to receiving the first SIP invite message, upon determining to forward the call from the second electronic device, obtain contact information related to the call forwarding from the second electronic device, generate a response message comprising the contact information related to the call forwarding, and transmit the response message to the server to provide the response message comprising the contact information from the server to the second electronic device through the transceiver, wherein the contact information in the response message transmitted to the server is used by the server to generate a second SIP invite message to be transmitted to the third electronic device.

In accordance with another aspect of the disclosure, a method at a first electronic device (ex: a called electronic device) for forwarding a call from a second electronic device (ex: a calling electronic device) to third electronic device (ex: another called electronic device) is provided. The method includes receiving from a server a first SIP invite message generated at the second electronic device through a transceiver of the first electronic device, determining whether to forward the call from the second electronic device, in response to receiving the first SIP invite message, upon determining to forward the call from the second electronic device, obtaining contact information related to the call forwarding from the second electronic device, generating a response message including the contact information related to the call forwarding, and transmitting the response message to the server to provide the response message including the contact information from the server to the second electronic device through the transceiver of the first electronic device. The contact information in the response message transmitted to the server may be used by the server to generate a second SIP invite message to be transmitted to the third electronic device.

In accordance with another aspect of the disclosure, one or more non-transitory computer-readable recording media storing one or more computer programs including computer-executable instructions that, when executed by one or more processors, cause a called electronic device to perform operations are provided. The operations include receiving from a server a first SIP invite message generated at the second electronic device through a transceiver of the first electronic device, determining whether to forward the call from the second electronic device, in response to receiving the first SIP invite message, upon determining to forward the call from the second electronic device, obtaining contact information related to the call forwarding from the second electronic device, generating a response message including the contact information related to the call forwarding, and transmitting the response message to the server to provide the response message including the contact information from the server to the second electronic device through the transceiver of the first electronic device. The contact information in the response message transmitted to the server may be used by the server to generate a second SIP invite message to be transmitted to the third electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a diagram of a response message example including contact information and call blocking information according to an embodiment of the disclosure;

FIG. 9 is a diagram of a second session initiation protocol (SIP) invite message example including contact information and call blocking information according to an embodiment of the disclosure;

Throughout the drawings, it should be noted that like reference numbers are used to depict the same or similar elements, features, and structures.

DETAILED DESCRIPTION

Figure 1:
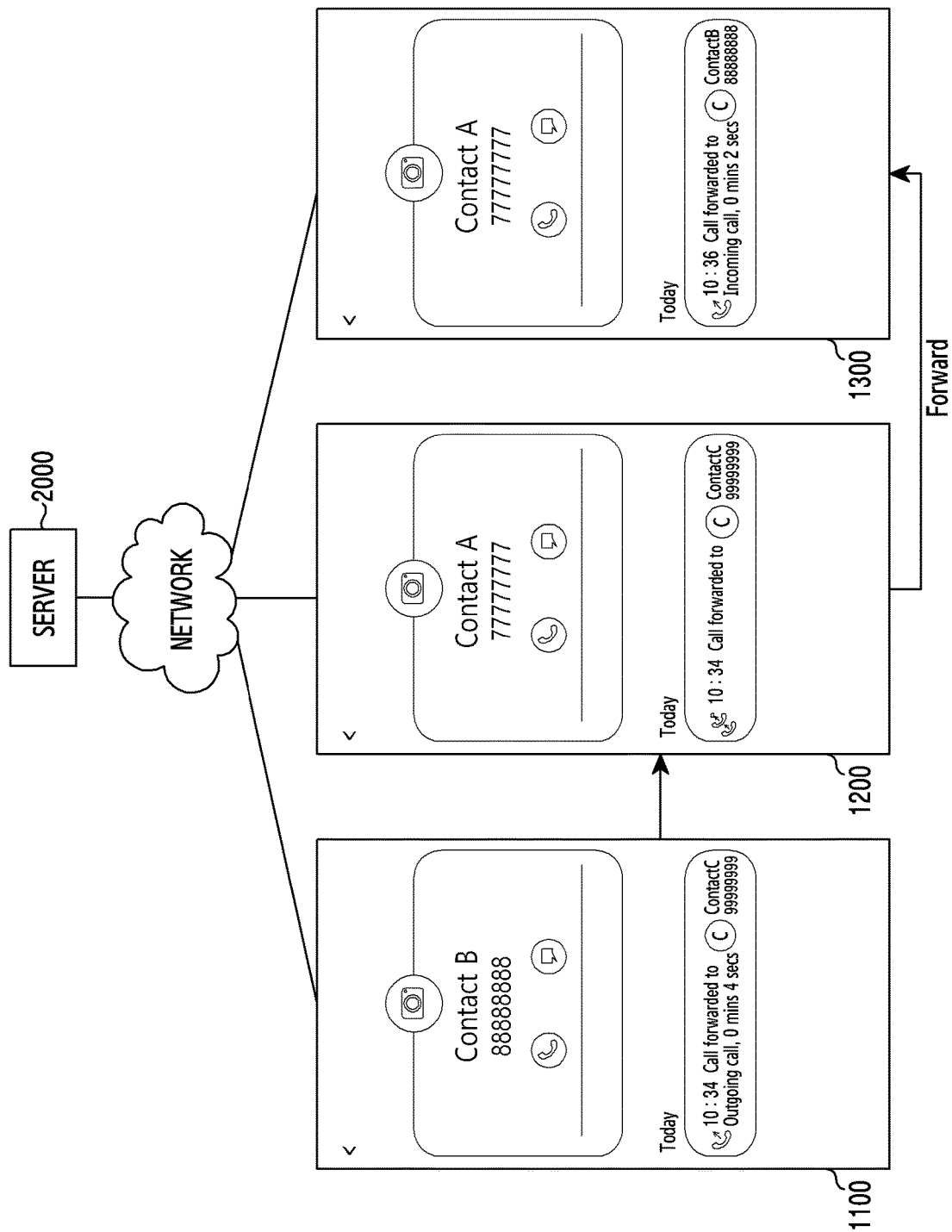
FIG. 1 is a simplified diagram of a system for forwarding a call from a calling electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, terms such as first and second may be used to describe various components, but the components should not be limited by these terms. These terms are used to distinguish one component from another component.

Throughout the specification, if a part is "connected" to another part, it embraces not only "directly connected", but also "electrically connected" between other element in between. In addition, if a part "includes" a certain component, this means that it may further include another component, without excluding other component unless otherwise stated.

The expression "in an embodiment" and the like appearing in various parts of the disclosure are not intended to indicate the same embodiment.

An embodiment of the disclosure may be represented by functional block configurations and various operations. Some or all of the functional blocks may be implemented by various numbers of hardware and/or software configurations for performing specific functions. For example, the functional blocks of the disclosure is implemented by one or more microprocessors or by circuit configurations for a specific function. For example, the functional blocks of the disclosure are implemented in various programming or scripting languages. The functional blocks may be implemented in an algorithm executed by one or more processors. In addition, the disclosure may employ conventional art for electronic environment configuration, signal processing, and/or data processing. Terms such as "mechanism", "element", "means" and "configuration" may be widely used, and are not limited to mechanical and physical configurations.

In addition, connection lines or connection members between the components shown in the drawings are merely illustrative of functional connections and/or physical or circuit connections. An actual device may represent connections between components using various functional connections, physical connections, or circuit connections which are replaceable or added.

Hereinafter, the disclosure will be elucidated with reference to the accompanying drawings.

According to an embodiment of the disclosure, a first electronic device (ex: a called electronic device) for forwarding a call from a second electronic device (ex: a calling electronic device) to third electronic device (ex: another called electronic device) may include a transceiver, a memory for storing instructions, and a processor operatively coupled with the transceiver and the memory and executing the instructions, and the processor may be configured to, by executing the instructions, receive from a server a first SIP invite message generated at the second electronic device, determine whether to forward the call from the second electronic device, in response to receiving the first SIP invite message, upon determining to forward the call from the second electronic device, obtain contact information related to the call forwarding from the second electronic device, generate a response message including the contact information related to the call forwarding, and transmit the response message to the server to provide the response message including the contact information from the server to the second electronic device.

In addition, the contact information in the response message transmitted to the server may be used by the server to generate a second SIP invite message to be transmitted to the third electronic device.

In addition, the processor may be configured to, by executing the instructions, identify whether the call from the second electronic device is blocked, and generate call blocking information indicating whether the call from the second electronic device is blocked.

In addition, the processor may be configured to, by executing the instructions, generate the response message including the contact information related to the call forwarding and the call blocking information.

In addition, the contact information related to the call forwarding may include contact information of the second electronic device, contact information of the first electronic device and contact information of the third electronic device.

Hence, the first electronic device may provide the server with the contact information of the second electronic device, the first electronic device and the third electronic device in the response message for the call forwarding, and the contact information of the second electronic device, the first electronic device and the third electronic may be effectively utilized in the call forwarding.

In addition, the call blocking information may include an identifier indicating whether the call from the second electronic device is blocked by the first electronic device.

In addition, based on the contact information related to the call forwarding in the response message provided to the second electronic device, a GUI guiding that the call is forwarded by the first electronic device to the third electronic device may be displayed on an outgoing call screen of the second electronic device.

Thus, based on the contact information of the second electronic device, the first electronic device and the third electronic device provided from the first electronic device, users of the second electronic device and the third electronic device may effectively identify electronic devices related to the call forwarding, in the call forwarding.

In addition, the second SIP invite message may include the contact information and the call blocking information of the response message transmitted to the server.

In addition, based on the contact information in the second SIP invite message provided to the third electronic device, a GUI guiding that the call is forwarded by the first electronic device to the third electronic device may be displayed on an incoming call screen of the third electronic device.

In addition, based on the call blocking information in the second SIP invite message, the call forwarded to the third electronic device may be ignored by the third electronic device.

In addition, the processor may be configured to, by executing the instructions, generate history information of the call forwarding.

In addition, the history information of the call forwarding may include contact information of the second electronic device, contact information of the third electronic device, information indicating that the second electronic device originates the call, information indicating that the first electronic device forwards the call, and information indicating that the third electronic device receives the forwarded call.

Hence, if the history information of the call forwarding is provided, users of the second electronic device, the first electronic device and the third electronic device may effectively identify the contact information of the second electronic device, the first electronic device and the third electronic device, provided from the first electronic device.

In addition, according to an embodiment of the disclosure, a method of a first electronic device (ex: a called electronic device) for forwarding a call from a second electronic device (ex: a calling electronic device) to third electronic device (ex: another called electronic device) may include receiving from a server a first SIP invite message generated at the second electronic device, determining whether to forward the call from the second electronic device, in response to receiving the first SIP invite message, upon determining to forward the call from the second electronic device, obtaining contact information related to the call forwarding from the second electronic device, generating a response message including the contact information related to the call forwarding, and transmitting the response message to the server to provide the response message including the contact information from the server to the second electronic device.

In addition, the contact information in the response message transmitted to the server may be used by the server to generate a second SIP invite message to be transmitted to the third electronic device.

In addition, the method may further include identifying whether the call from the second electronic device is blocked, and generating call blocking information indicating whether the call from the second electronic device is blocked.

In addition, generating the response message may include generating the response message including the contact information related to the call forwarding and the call blocking information.

In addition, the contact information related to the call forwarding may include contact information of the second electronic device, contact information of the first electronic device and contact information of the third electronic device.

In addition, the call blocking information may include an identifier indicating whether the call from the second electronic device is blocked by the first electronic device.

In addition, based on the contact information related to the call forwarding in the response message provided to the second electronic device, a GUI guiding that the call is forwarded by the first electronic device to the third electronic device may be displayed on an outgoing call screen of the second electronic device.

In addition, the second SIP invite message may include the contact information and the call blocking information of the response message transmitted to the server.

In addition, based on the contact information in the second SIP invite message provided to the third electronic device, a GUI guiding that the call is forwarded by the first electronic device to the third electronic device may be displayed on an incoming call screen of the third electronic device.

In addition, based on the call blocking information in the second SIP invite message, the call forwarded to the third electronic device may be ignored by the third electronic device.

In addition, the method may further include generating history information of the call forwarding.

Also, according to an embodiment of the disclosure, a computer-readable recording medium which records a program for executing a method for forwarding a call from a second electronic device (ex: a calling electronic device) to third electronic device (ex: another called electronic device) may be provided. The method may include receiving from a server a first SIP invite message generated at the second electronic device, determining whether to forward the call from the second electronic device, in response to receiving the first SIP invite message, upon determining to forward the call from the second electronic device, obtaining contact information related to the call forwarding from the second electronic device, generating a response message including the contact information related to the call forwarding, and transmitting the response message to the server to provide the response message including the contact information from the server to the second electronic device, and the contact information in the response message transmitted to the server may be used by the server to generate a second SIP invite message to be transmitted to the third electronic device.

Also, according to an embodiment of the disclosure, a method of a server for forwarding a call from a calling electronic device to a first called electronic device may include receiving a first session initiation protocol (SIP) invite message generated at the calling electronic device, from the calling electronic device, transmitting the first SIP invite message to the first called electronic device, receiving a response message including contact information for forwarding the call to another called electronic device, from the first called electronic device, generating a second SIP invite message including the contact information of the response message, transmitting a response message including the contact information to the calling electronic device, and transmitting the generated second SIP invite message to the second called electronic device, and at least a part of the contact information may be displayed on an outgoing call screen of the calling electronic device and an incoming call screen of the second called electronic device.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a simplified diagram of a system for forwarding a call from a calling electronic device according to an embodiment of the disclosure.

Referring to FIG. 1, the system for forwarding a call from a calling electronic device 1100 may include the calling electronic device 1100, a first called electronic device 1200, a second called electronic device 1300 and a server 2000. The calling electronic device 1100, the first called electronic device 1200, the second called electronic device 1300 and the server 2000 may transmit and receive data for the call forwarding through a session initiation protocol (SIP). The calling electronic device 1100 may be a mobile originated (MO) device, the first called electronic device 1200 may be a mobile forwarding (MF) device, and the second called electronic device 1300 may be a mobile terminated (MT) device.

The calling electronic device 1100 may transmit a first SIP invite message to the first called electronic device 1200 via the server 2000 to perform a call with the first called electronic device 1200, and the first called electronic device 1200 may forward a call requested from the calling electronic device 1100 to the second called electronic device 1300.

The first called electronic device 1200 may provide a response message including contact information of the second called electronic device 1300 to the server 2000, thus allowing the calling electronic device 1100 and the second called electronic device 1300 each to display call forwarding information on their screen.

The calling electronic device 1100 may display a graphical user interface (GUI) indicating the call forwarded from the first called electronic device 1200 to the second called electronic device 1300, on an outgoing call screen.

The second called electronic device 1300 may display a GUI indicating the call forwarded from the first called electronic device 1200 to the second called electronic device 1300, on an incoming call screen.

The calling electronic device 1100, the first called electronic device 1200, and the second called electronic device 1300 includes, for example, a mobile communication device (e.g., a smartphone), a computer device, a portable multimedia device, a portable medical device, a camera, a wearable device, or a home appliance. The calling electronic device 1100, the first called electronic device 1200 and the second called electronic device 1300 according to an embodiment of the disclosure are not limited those devices.

In addition, the disclosure has described, but not limited to, that the calling electronic device 1100 requests the call from the first called electronic device 1200 and the first called electronic device 1200 forwards the call to the second called electronic device 1300 to ease the understanding. The calling electronic device 1100 may serve as the first called electronic device 1200 or the second called electronic device 1300, the first called electronic device 1200 may serve as the calling electronic device 1100 or the second called electronic device 1300, or the second called electronic device 1300 may serve as the calling electronic device 1100 or the first called electronic device 1200.

Figure 2:
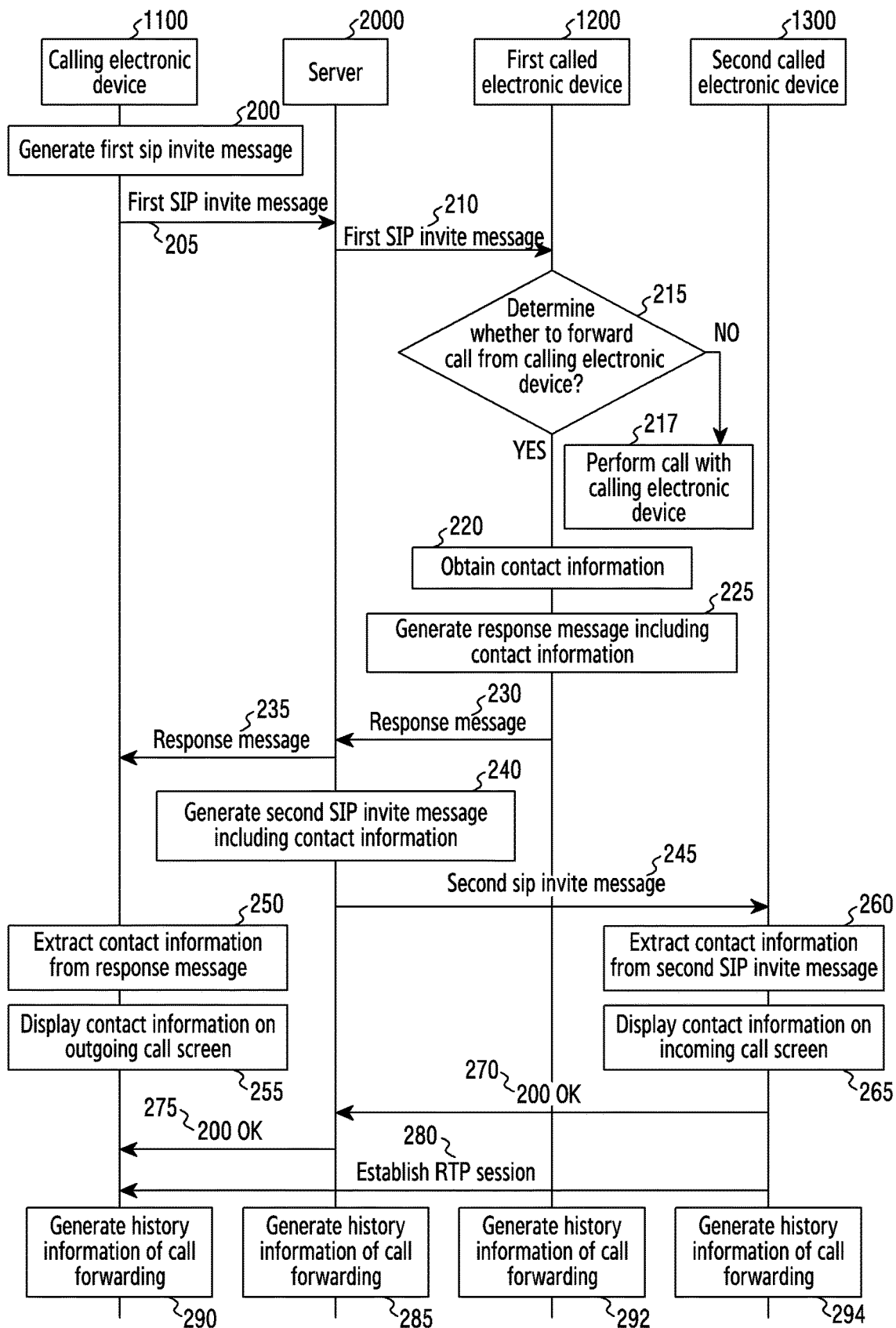
FIG. 2 is a flowchart of a method for forwarding a call of a calling electronic device from a called electronic device to another called electronic device according to an embodiment of the disclosure.

FIG. 2 is a flowchart of a method for forwarding a call of a calling electronic device from a called electronic device to another called electronic device according to an embodiment of the disclosure.

Referring to FIG. 2, in operation 200, the calling electronic device 1100 may generate a first SIP invite message. The calling electronic device 1100 may generate the first SIP invite message for a call with the first called electronic device 1200, and the first SIP invite message may include an identifier (ID) value of the calling electronic device 1100 and an ID value of the first called electronic device 1200. The SIP invite message includes, for example, but not limited to, a phone number of the calling electronic device 1100 and a phone number of the first called electronic device 1200.

The calling electronic device 1100 may transmit the first SIP invite message to the server 2000 in operation 205, and the server 2000 may transmit the first SIP invite message to the first called electronic device 1200 in operation 210.

In operation 215, the first called electronic device 1200 may determine whether to forward the call from the calling electronic device 1100. According to an embodiment, during a call with other electronic device (not shown), the first called electronic device 1200 may determine to forward the call from the calling electronic device 1100. For example, if the first called electronic device 1200 receives the first SIP invite message from the server 2000 during the call with other electronic device (not shown), the first called electronic device 1200 determines to forward the call from the calling electronic device 1100.

According to an embodiment, if the first called electronic device 1200 receives a user input for rejecting the call with the calling electronic device 1100, the first called electronic device 1200 may determine to forward the call from the calling electronic device 1100. For example, if the first called electronic device 1200 receiving the first SIP invite message receives the user input for rejecting the call or forwarding the call, the first called electronic device 1200 determines to forward the call from the calling electronic device 1100.

According to an embodiment, if the first called electronic device 1200 satisfies a condition preset by the user for the call forwarding, the first called electronic device 1200 may determine to forward the call from the calling electronic device 1100. For example, if a phone number for the call forwarding is preset and the first called electronic device 1200 receives the first SIP invite message from the calling electronic device 1100 having the preset phone number, the first called electronic device 1200 determines to forward the call from the calling electronic device 1100. In this case, the preset phone number may be, but not limited to, a phone number selected by the user for the call forwarding or a phone number blocked by the user. For example, if the first called electronic device 1200 is configured to forward every call of the first called electronic device 1200 and receives the first SIP invite message from the calling electronic device 1100, the first called electronic device 1200 determines to forward the call from the calling electronic device 1100.

If determining not to forward the call from the calling electronic device 1110 in operation 215, the first called electronic device 1200 may perform the call with the calling electronic device 1100 in operation 217. For example, the first called electronic device 1200 provides '180: ringing' code and '200 OK' code to the calling electronic device 1100 via the server 2000, and establish a real-time transport protocol (RTP) session with the calling electronic device 1100.

If determining to forward the call from the calling electronic device 1110 in operation 215, the first called electronic device 1200 may obtain contact information in operation 220. The first called electronic device 1200 may obtain the contact information related to the call forwarding. The contact information may include an ID value of the electronic device for the call connection, for example, but not limited to, a phone number of the electronic device, a user name of the electronic device and a user nickname of the electronic device.

According to an embodiment, the first called electronic device 1200 may obtain contact information of the calling electronic device 1100, based on the phone number of the calling electronic device 1100 in the first SIP invite message. For example, the first called electronic device 1200 obtains the contact information corresponding to the calling electronic device 1100 from a phonebook of the user of the first called electronic device 1200. The phonebook of the user of the first called electronic device 1200 may be stored in the first called electronic device 1200 or another server (not shown). The contact information of the calling electronic device 1100 includes, for example, but not limited to, the phone number of the calling electronic device 1100, a user name of the calling electronic device 1100 and a nickname of the calling electronic device 1100.

According to an embodiment, the first called electronic device 1200 may obtain contact information of the second called electronic device 1300 for receiving the forwarded call. In this case, for example, the first called electronic device 1200 presets the second called electronic device 1300 for receiving the forwarded call, and the first called electronic device 1200 may obtain the contact information of the second called electronic device 1300 which is preset. Alternatively, for example, the first called electronic device 1200 may display a GUI for selecting the second called electronic device 1300 for receiving the forwarded call, and select the second called electronic device 1300 based on a user input for the GUI. The first called electronic device 1200 may obtain the contact information of the second called electronic device 1300 selected by the user, from a user's phonebook. The contact information of the second called electronic device 1300 includes, for example, but not limited to, a phone number of the second called electronic device 1300, a user name of the second called electronic device 1300 and a nickname of the second called electronic device 1300.

According to an embodiment, the first called electronic device 1200 may obtain the contact information of the first called electronic device 1200 which forwards the call. The contact information of the first called electronic device 1200 includes, for example, but not limited to, the phone number of the first called electronic device 1200, the name user and the nickname of the first called electronic device 1200.

In operation 225, the first called electronic device 1200 may generate a response message including the contact information. The response message including the contact information includes, for example, a 'Via' header, a 'From' header, a 'To' header, a 'Call-ID' header, a 'CSeq' header, a 'Contact' header, a 'Content-length' header and a 'Call-info' header. The first called electronic device 1200 may generate the response message including the contact information, by adding a separate header where the contact information is recorded, to the response message. For example, the first called electronic device 1200 generates the response message including the contact information by adding to the response message the 'Call-info' header where the contact information is recorded. In this case, the response message generated by the first called electronic device 1200 may include, as a value corresponding to the 'Call-info' header, the contact information of the calling electronic device 1100, the contact information of the first called electronic device 1200 and the contact information of the second called electronic device 1300.

For example, the first called electronic device 1200 generates a response message further including call blocking information. The call blocking information may include a value indicating whether the call from the calling electronic device 1100 is blocked by the first called electronic device 1200. In this case, the response message may include, as the value corresponding to the 'Call-info' header, the call blocking information indicating whether the call of the calling electronic device 1100 is blocked.

The response message including the contact information shall be explained in, for example, FIG. 8.

The first called electronic device 1200 may transmit the response message to the server 2000 in operation 230, and the server 2000 may transmit the response message to the calling electronic device 1100 in operation 235.

In operation 240, the server 2000 may generate a second SIP invite message including the contact information. The second SIP invite message may be transmitted from the server 2000 to the second called electronic device 1300 for the call forwarding. The server 2000 may obtain the contact information from the response message received from the first called electronic device 1200, and generate the second SIP invite message including the contact information by using at least part of the obtained contact information.

The second SIP invite message including the contact information includes, for example, the 'Via' header, the 'From' header, the 'To' header, the 'Call-ID' header, the 'CSeq' header, the 'Contact' header, the 'Content-length' header and the 'Call-info' header. The server 2000 may generate the second SIP invite message including the contact information, by adding a separate header recording the contact information to the second SIP invite message. For example, the server 2000 generates the second SIP invite message including the contact information by adding to the second SIP invite message the 'Call-info' header where the contact information is recorded. In this case, the second SIP invite message generated by the server 2000 may include, as the value corresponding to the 'Call-info' header, the contact information of the calling electronic device 1100, the contact information of the first called electronic device 1200 and the contact information of the second called electronic device 1300.

For example, the server 2000 generates the second SIP invite message further including the call blocking information. The call blocking information may include the value indicating whether the call from the calling electronic device 1100 is blocked by the first called electronic device 1200. In this case, the second SIP invite message may further include, as the value corresponding to the 'Call-info' header, the call blocking information indicating whether the call of the calling electronic device 1100 is blocked.

The second SIP invite message including the contact information shall be explained in, for example, FIG. 8.

In operation 245, the server 2000 may transmit the second SIP invite message to the second called electronic device 1300.

In operation 250, the calling electronic device 1100 may extract the contact information from the response message. The calling electronic device 1100 may extract the contact information from the response message, and identify from the extracted contact information whether the first called electronic device 1200 attempts to forward the call to the second called electronic device 1300. For example, the calling electronic device 1100 obtains the contact information of the first called electronic device 1200 which forwards the call and the contact information of the second called electronic device 1300 which is to receive the forwarded call, from the response message.

In operation 255, the calling electronic device 1100 may display the contact information on the outgoing call screen. The calling electronic device 1100 may display the outgoing call screen after transmitting the first SIP invite message for the sake of the call with the first called electronic device 1200, and if receiving the response message including the contact information from the server 2000 while displaying the outgoing call screen, display the contact information obtained from the received response message on the outgoing call screen. For example, the calling electronic device 1100 displays a text indicating that the call for the first called electronic device 1200 is forwarded by the first called electronic device 1200 to the second called electronic device 1300, on the outgoing call screen.

In operation 260, the second called electronic device 1300 may extract the contact information from the second SIP invite message. The second called electronic device 1300 may extract the contact information from the second SIP invite message, and identify from the extracted contact information whether the first called electronic device 1200 attempts to forward the call to the second called electronic device 1300. For example, the second called electronic device 1300 obtains the contact information of the calling electronic device 1100 which originates the call to the first called electronic device 1200 and the contact information of the first called electronic device 1200 which forwards the call, from the second SIP invite message.

In operation 265, the second called electronic device 1300 may display the contact information on the incoming call screen. If receiving the second SIP invite message from the server 2000, the second called electronic device 1300 may display the incoming call screen indicating that the forwarded call is incoming. The second called electronic device 1300 may display the contact information obtained from the received second SIP invite message on the incoming call screen. For example, the second called electronic device 1300 displays a text indicating that the call from the calling electronic device 1100 to the first called electronic device 1200 is forwarded by the first called electronic device 1200 to the second called electronic device 1300, on the incoming call screen.

The second called electronic device 1300 may transmit a SIP response code (e.g., 200 OK) to the server 2000 in operation 270, and the server 2000 may transmit the SIP response code (e.g., 200 OK) to the calling electronic device 1100 in operation 275. The SIP response code (e.g., 200 OK) may request the call connection with the calling electronic device 1100.

In operation 280, the calling electronic device 1100 may establish an RTP session for the call with the second called electronic device 1300. As the RTP session is established, the calling electronic device 1100 may conduct the call with the second called electronic device 1300.

In operation 285, the server 2000 may generate history information of the call forwarding. The call forwarding history information generated by the server 2000 includes, for example, the contact information of the calling electronic device 1100, the contact information of the first called electronic device 1200, the contact information of the second called electronic device 1300, information indicating that the calling electronic device 1100 originates the call, information indicating that the first called electronic device 1200 forwards the call, and information indicating that the second called electronic device 1300 receives the forwarded call. If the second called electronic device 1300 rejects the forwarded call, the server 2000 may not generate history information of the rejected forwarded call.

In operation 290, the calling electronic device 1100 may generate history information of the call forwarding. The call forwarding history information generated by the calling electronic device 1100 includes, for example, the contact information of the first called electronic device 1200, the contact information of the second called electronic device 1300, information indicating that the calling electronic device 1100 originates the call, information indicating that the first called electronic device 1200 forwards the call, and information indicating that the second called electronic device 1300 receives the forwarded call.

In operation 292, the first called electronic device 1200 may generate history information of the call forwarding. The call forwarding history information generated by the first called electronic device 1200 includes, for example, the contact information of the calling electronic device 1100, the contact information of the second called electronic device 1300, information indicating that the calling electronic device 1100 originates the call, information indicating that the first called electronic device 1200 forwards the call, and information indicating that the second called electronic device 1300 receives the forwarded call.

In operation 294, the second called electronic device 1300 may generate history information of the call forwarding. The call forwarding history information generated by the second called electronic device 1300 includes, for example, the contact information of the calling electronic device 1100, the contact information of the first called electronic device 1200, information indicating that the calling electronic device 1100 originates the call, information indicating that the first called electronic device 1200 forwards the call, and information indicating that the second called electronic device 1300 receives the forwarded call.

It has been described, but not limited to, that the server 2000, the calling electronic device 1100, the first called electronic device 1200 and the second called electronic device 1300 each generate the call forwarding history information. According to an embodiment, at least one of the server 2000, the calling electronic device 1100, the first called electronic device 1200 and the second called electronic device 1300 may not generate the call forwarding history information. For example, at least one of the calling electronic device 1100, the first called electronic device 1200 and the second called electronic device 1300 do not generate the call forwarding history information, wherein an electronic device not generating the call forwarding history information may receive from the server 2000 the history information generated by the server 2000.

The call forwarding history information may be generated and managed apart from history information of normal calls not forwarded.

Figure 3:
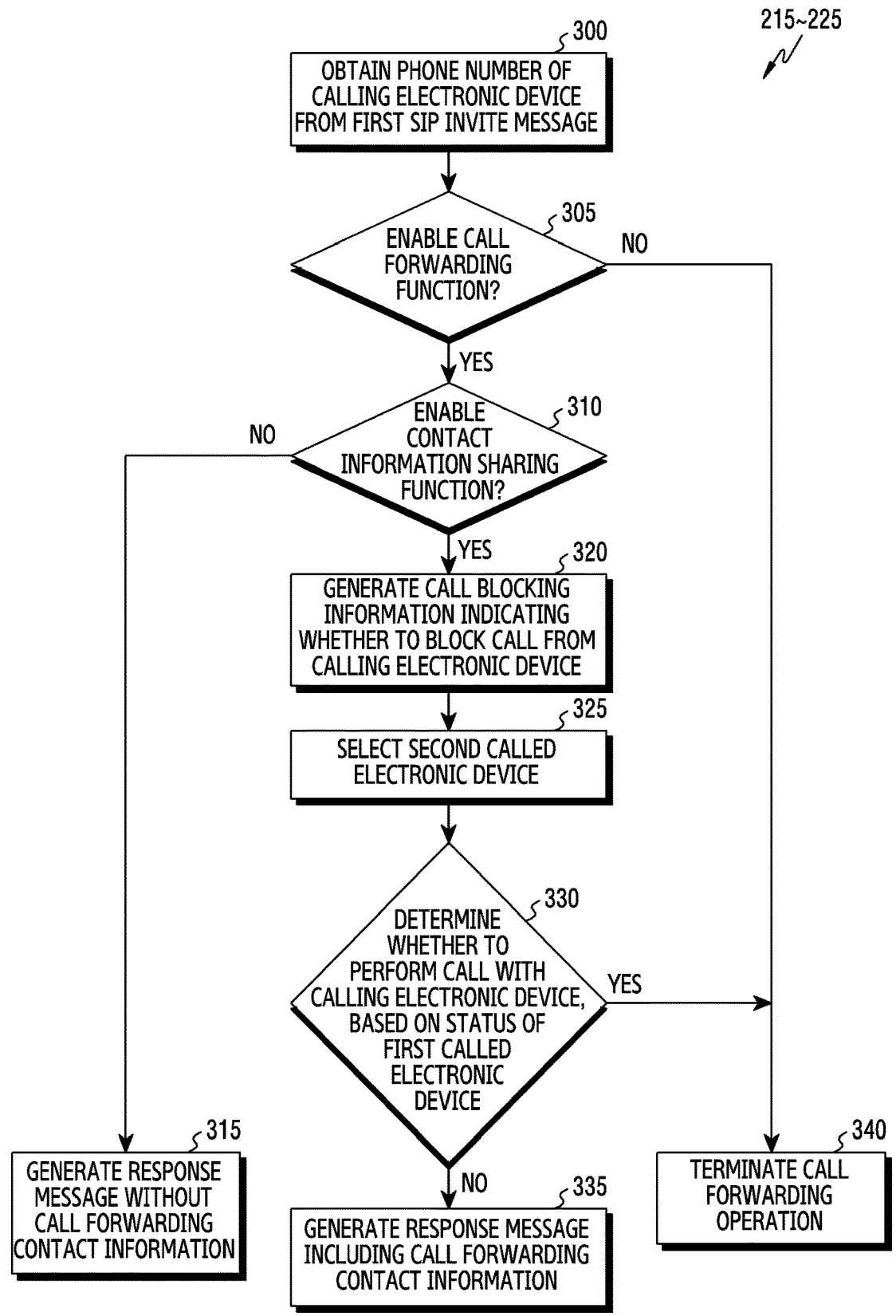
FIG. 3 is a flowchart of a method of a first called electronic device for generating a response message to forward a call from a calling electronic device according to an embodiment of the disclosure.

FIG. 3 is a flowchart of a method of a first called electronic device for generating a response message to forward a call from a calling electronic device according to an embodiment of the disclosure. Operation 300 through operation 340 of FIG. 3 may correspond to operation 215 through operation 225 of FIG. 2.

Referring to FIG. 3, in operation 300, the first called electronic device 1200 may obtain the phone number of the calling electronic device 1100 from the first SIP invite message. The first called electronic device 1200 may obtain the phone number of the calling electronic device 1100 contained in the first SIP invite message, from the first SIP invite message.

In operation 305, the first called electronic device 1200 may determine whether a call forwarding function is enabled. The first called electronic device 1200 may preset whether to enable the call forwarding function, and determine whether the call forwarding function is enabled, based on the setting. In this case, the first called electronic device 1200 may enable the call forwarding function according to a user input through a GUI for enabling the call forwarding function. If the call forwarding function of the first called electronic device 1200 is not enabled, the first called electronic device 1200 may display the GUI for enabling the call forwarding function and receive a user input for the GUI, in response to receiving the first SIP invite message. The GUI for enabling the call forwarding function shall be described in, for example, FIG. 7.

According to an embodiment, the first called electronic device 1200 may enable the call forwarding function for each phone number of the calling electronic device 1100. In this case, the first called electronic device 1200 may determine whether the call forwarding function is enabled for the calling electronic device 1100, based on the phone number of the calling electronic device 1100.

If determining that the call forwarding function is not enabled in operation 305, the first called electronic device 1200 may terminate the call forwarding operation in operation 340.

If determining that the call forwarding function is enabled in operation 305, the first called electronic device 1200 may determine whether a contact information sharing function is enabled in operation 310. The contact information sharing function may be a function for sharing the contact information related to the call forwarding, with at least one of the calling electronic device 1100, the server 2000 and the second called electronic device 1300 if the first called electronic device 1200 performs the call forwarding.

The first called electronic device 1200 may preset whether to enable the contact information sharing function, and determine based on the setting whether the contact information sharing function is enabled. In this case, the first called electronic device 1200 may enable the contact information sharing function according to a user input through a GUI for enabling the contact information sharing function. If the contact information sharing function of the first called electronic device 1200 is not enabled, in response to receiving the first SIP invite message, the first called electronic device 1200 may display the GUI for enabling the contact information sharing function and receive a user input for the GUI. The GUI for enabling the contact information sharing function shall be described in, for example, FIG. 7.

According to an embodiment, the first called electronic device 1200 may enable the contact information sharing function for each phone number of the calling electronic device 1100. In so doing, the first called electronic device 1200 may determine whether the contact information sharing function is enabled for the calling electronic device 1100, based on the phone number of the calling electronic device 1100.

If determining that the contact information sharing function is not enabled in operation 310, the first called electronic device 1200 may generate a response message not including the call forwarding contact information in operation 315. For example, the first called electronic device 1200 generates the response message not including a separate header containing the contact information to be displayed on the outgoing call screen of the calling electronic device 1100 and the incoming call screen of the second called electronic device 1300. For example, the first called electronic device 1200 generates the response message not including the 'Call-info' header where the contact information is recorded.

If determining that the contact information sharing function is enabled in operation 310, the first called electronic device 1200 may generate the call blocking information indicating whether to block a call from the calling electronic device 1100 in operation 320. For example, if the phone number of the calling electronic device 1100 is set to be blocked by the first called electronic device 1200, the first called electronic device 1200 generates the call blocking information indicating that the call from the calling electronic device 1100 is blocked. Alternatively, for example, if the phone number of the calling electronic device 1100 is not set to be blocked by the first called electronic device 1200, the first called electronic device 1200 generates the call blocking information indicating that the call from the calling electronic device 1100 is not blocked.

In operation 325, the first called electronic device 1200 may select the second called electronic device 1300. The first called electronic device 1200 may select the second called electronic device 1300 as the electronic device for receiving the forwarded call, based on a preset criterion. If the second called electronic device 1300 for receiving the forwarded call is preset, the first called electronic device 1200 may select the second called electronic device 1300 according to the setting. In this case, for example, the second called electronic device 1300 for receiving the forwarded call is preset, per calling electronic device 1100. Alternatively, for example, the electronic device for receiving the forwarded call is set to the second called electronic device 1300 with respect to every call requested from the first called electronic device 1200. Alternatively, for example, the second called electronic device 1300 is preset regardless of the phone number of the calling electronic device 1100.

According to an embodiment, the first called electronic device 1200 may select the second called electronic device 1300 according to a user input. The first called electronic device 1200 receiving the first SIP invite message may display a list for selecting the second called electronic device 1300, and select the second called electronic device 1300 for receiving the forwarded call, according to a user input for the list. For example, the first called electronic device 1200 displays a GUI inquiring whether to forward the call and a GUI for selecting the second called electronic device 1300 to the receive the forwarded call, on the incoming call screen indicating whether the call from the calling electronic device 1100 is requested, and select the second called electronic device 1300 based on user inputs through the GUIs.

In operation 330, the first called electronic device 1200 may determine whether to conduct the call with the calling electronic device 1100, based on a status of the first called electronic device 1200. For example, if the first called electronic device 1200 is engaged in a call, the first called electronic device 1200 does not respond, the first called electronic device 1200 is in absence, or the first called electronic device 1200 receive a user input for rejecting the call connection, the first called electronic device 1200 determines not to perform the call with the calling electronic device 1100. Alternatively, for example, if receiving a user input for accepting the call from the calling electronic device 1100, the first called electronic device 1200 determines to conduct the call with the calling electronic device 1100.

If determining to perform the call with the calling electronic device 1100 in operation 330, the first called electronic device 1200 may terminate the call forwarding operation in operation 340.

If determining not to perform the call with the calling electronic device 1100 in operation 330, the first called electronic device 1200 may generate a response message including the contact information related to the call forwarding in operation 335.

The response message including the contact information includes, for example, the 'Via' header, the 'From' header, the 'To' header, the 'Call-ID' header, the 'CSeq' header, the 'Contact' header, the 'Content-length' header and the 'Call-info' header. The first called electronic device 1200 may generate the response message including the contact information, by adding a separate header recording the contact information to the response message. For example, the first called electronic device 1200 generates the response message including the contact information by adding to the response message the 'Call-info' header where the contact information is recorded. In this case, the response message generated by the first called electronic device 1200 may include, as the value corresponding to the 'Call-info' header, the contact information of the calling electronic device 1100, the contact information of the first called electronic device 1200 and the contact information of the second called electronic device 1300.

For example, the first called electronic device 1200 generates a response message further including the call blocking information. The call blocking information may include the value indicating whether the call from the calling electronic device 1100 is blocked by the first called electronic device 1200. In this case, the response message may further include, as the value corresponding to the 'Call-info' header, the call blocking information indicating whether the call of the calling electronic device 1100 is blocked.

Figure 4:
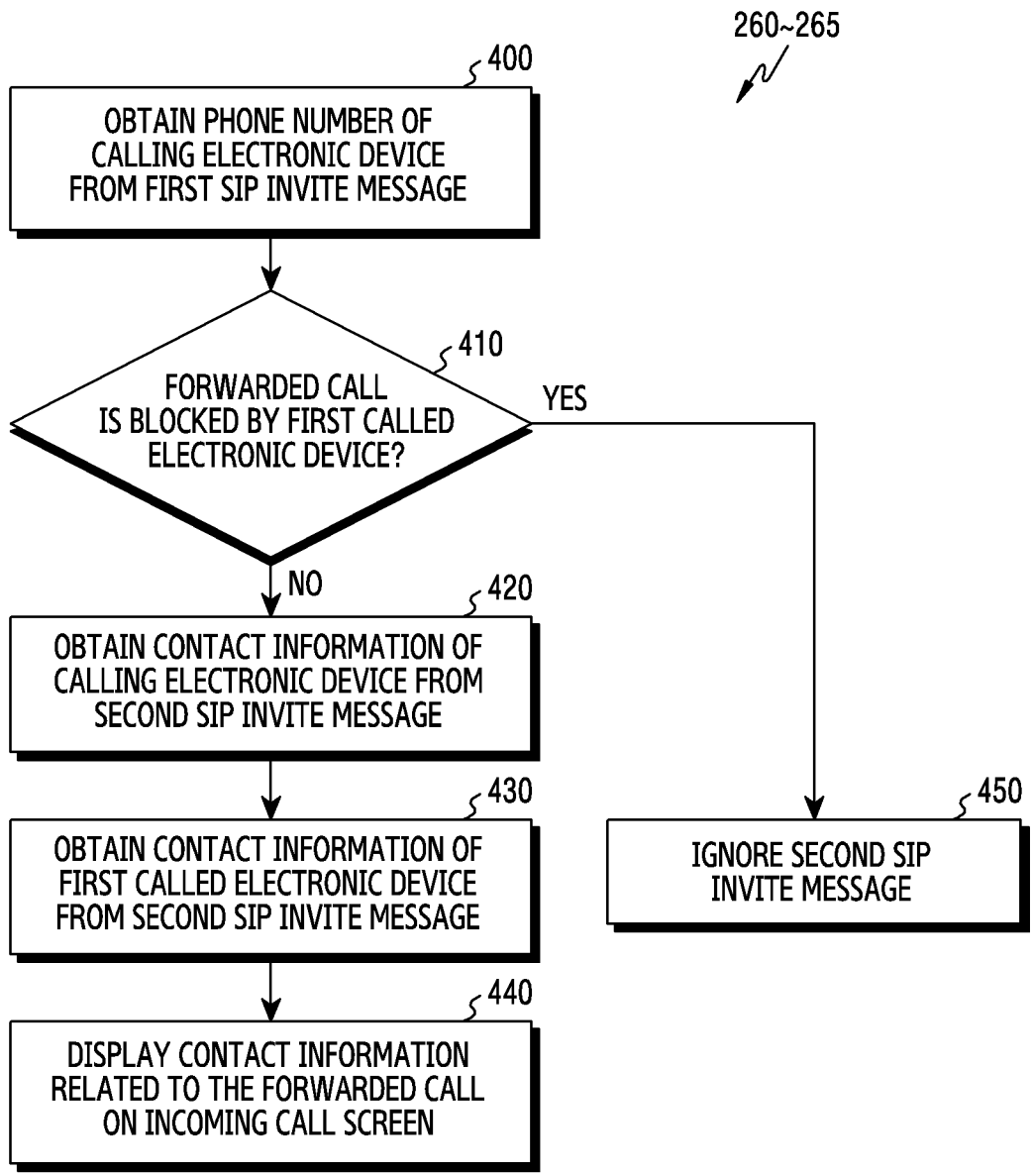
FIG. 4 is a flowchart of a method of a second called electronic device for receiving a call forwarded from a first called electronic device according to an embodiment of the disclosure.

FIG. 4 is a flowchart of a method of a second called electronic device for receiving a call forwarded from a first called electronic device according to an embodiment of the disclosure. Operation 400 through operation 450 of FIG. 4 may correspond to operation 260 through operation 265 of FIG. 2.

Referring to FIG. 4, in operation 400, the second called electronic device 1300 may obtain the call blocking information from the second SIP invite message. The second called electronic device 1300 may extract the value indicating whether a call from the calling electronic device 1100 is set to be blocked at the first called electronic device 1200, from the second SIP invite message. For example, the second called electronic device 1300 identifies the call blocking information indicating whether the calling electronic device 1100 is blocked, in the value corresponding to the 'Call-info' header of the second SIP invite message.

In operation 410, the second called electronic device 1300 may determine whether the forwarded call is blocked by the first called electronic device 1200. Based on the call blocking information obtained from the second SIP invite message, the second called electronic device 1300 may identify whether the call forwarded to the second called electronic device 1300 is blocked by the first called electronic device 1200.

If determining that the forwarded call is blocked by the first called electronic device 1200 in operation 410, the second called electronic device 1300 may ignore the forwarded call in operation 450. For example, the second called electronic device 1300 does not display the incoming call screen indicating that the forwarded call is incoming. If ignoring the forwarded call, the second called electronic device 1300 may not generate history information of the ignored forwarded call.

If determining that the forwarded call is not blocked by the first called electronic device 1200 in operation 410, the second called electronic device 1300 may obtain the contact information of the calling electronic device 1100 from the second SIP invite message in operation 420. For example, the second called electronic device 1300 identifies at least one of the phone number of the calling electronic device 1100, the user name of the calling electronic device 1100 or the user nickname of the calling electronic device 1100, in the value corresponding to the 'Call-info' header of the second SIP invite message.

In operation 430, the second called electronic device 1300 may obtain the contact information of the first called electronic device 1200 from the second SIP invite message. For example, the second called electronic device 1300 may identify at least one of the phone number of the first called electronic device 1200, the user name of the calling electronic device 1100 or the user nickname of the calling electronic device 1100, in the value corresponding to the 'Call-info' header of the second SIP invite message.

In operation 440, the second called electronic device 1300 may display the contact information related to the forwarded call, on the incoming call screen. The second called electronic device 1300 may display on the incoming call screen, information indicating that the call from the calling electronic device 1100 to the first called electronic device 1200 is forwarded by the first called electronic device 1200 to the second called electronic device 1300. For example, the second called electronic device 1300 displays the contact information of the calling electronic device 1100 which originates the call and the contact information of the first called electronic device 1200 which forwards the call, on the incoming call screen.

Figure 12:
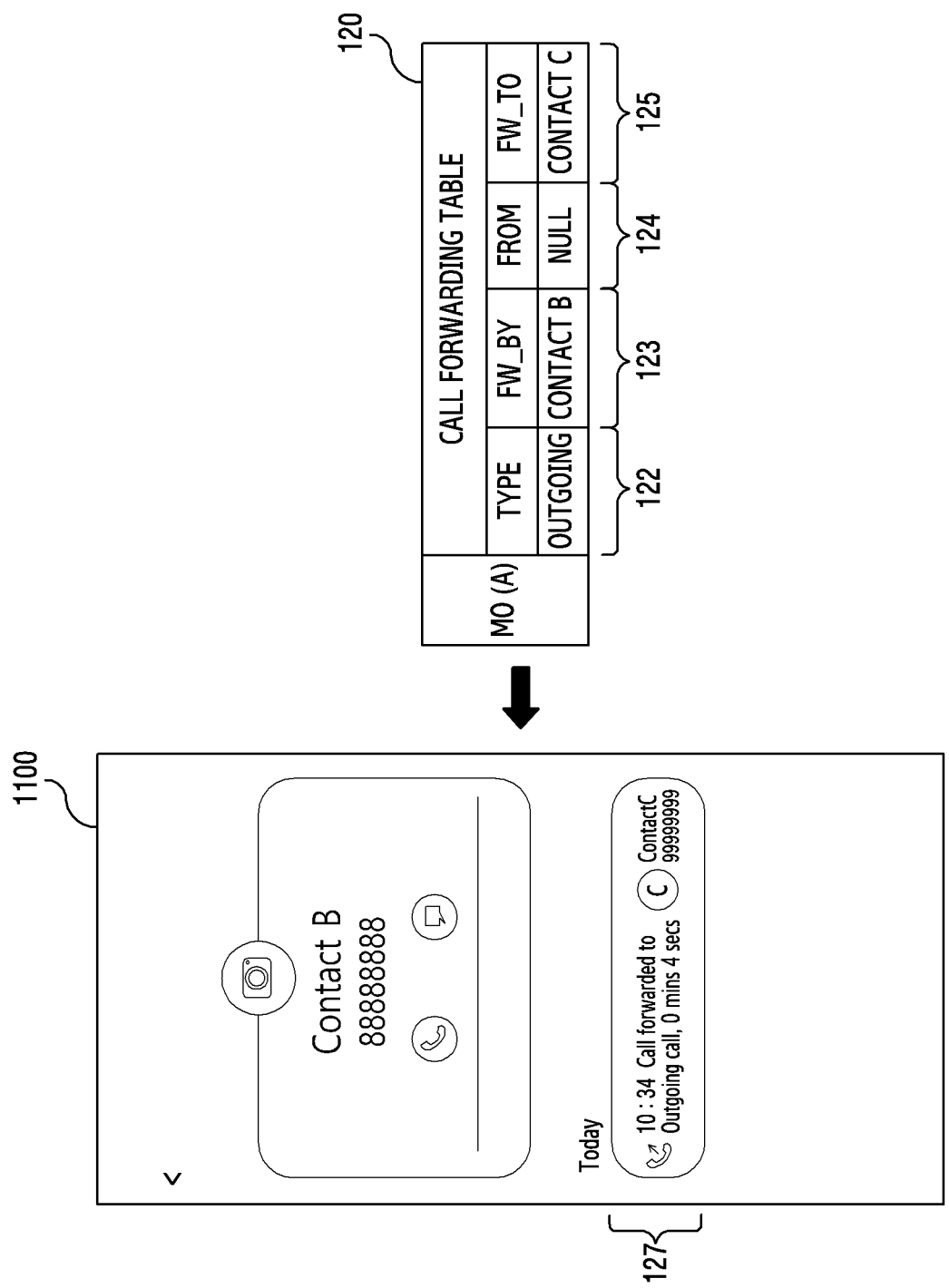
FIG. 12 is a diagram of an example of call forwarding history information stored in a calling electronic device and displayed on a screen of the calling electronic device according to an embodiment of the disclosure.

The incoming call screen of the second called electronic device 1300 displaying the contact information related to the forwarded call shall be explained in, for example, FIG. 12.

Figure 5:
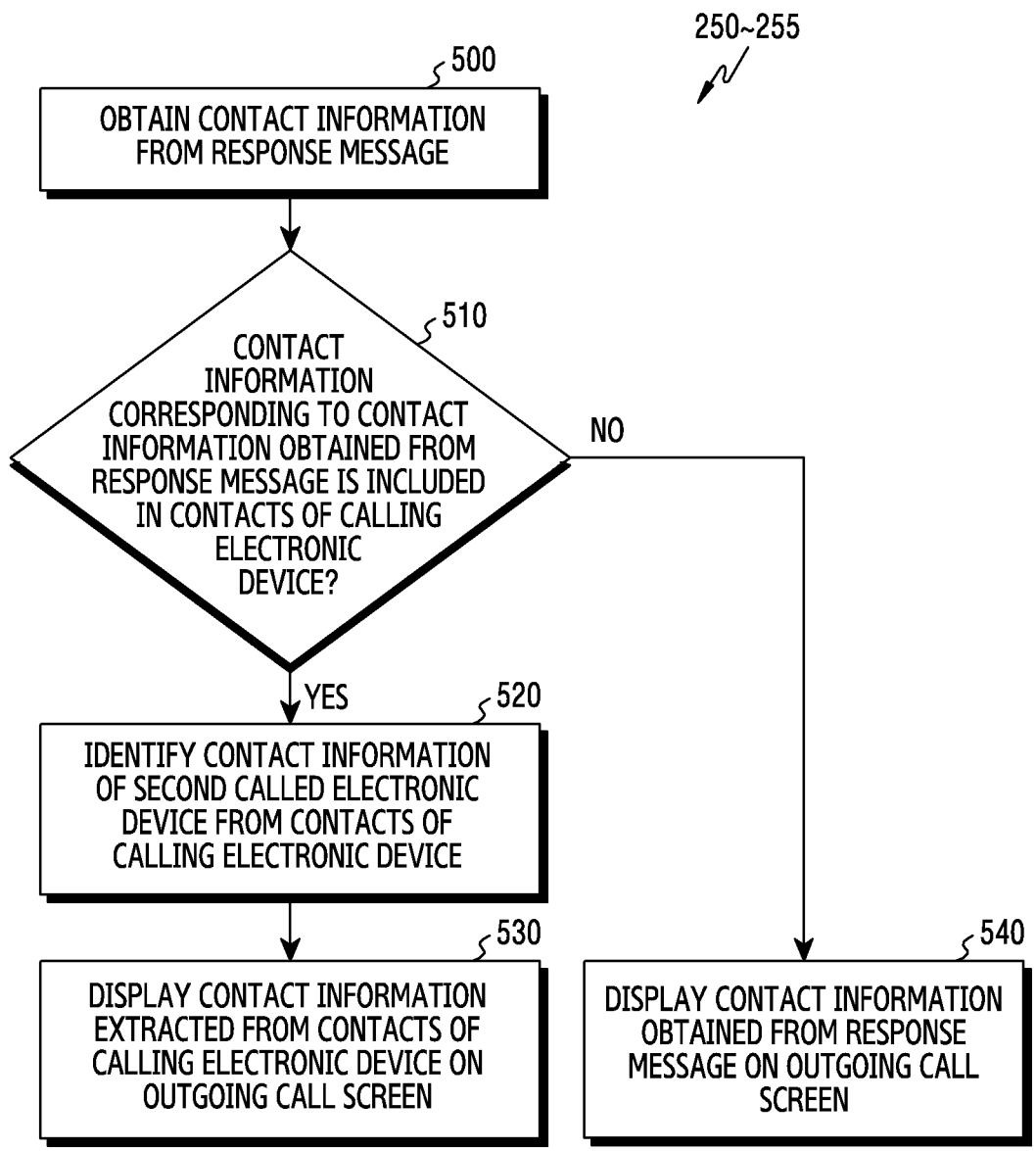
FIG. 5 is a flowchart of a method of a calling electronic device for displaying contact information related to a forwarded call on an outgoing call screen using contacts of the calling electronic device according to an embodiment of the disclosure.

FIG. 5 is a flowchart of a method of a calling electronic device for displaying contact information related to a forwarded call on an outgoing screen using contacts of the calling electronic device according to an embodiment of the disclosure. Operation 500 through operation 540 of FIG. 5 may correspond to operation 250 through operation 255 of FIG. 2.

Referring to FIG. 5, in operation 500, the calling electronic device 1100 may obtain the contact information from the response message. The calling electronic device 1100 may obtain the contact information related to the call forwarding from the header recording the contact information in the response message. For example, the calling electronic device 1100 identifies at least one of the phone number of the second called electronic device 1300, the user name of the second called electronic device 1300 or the user nickname of the second called electronic device 1300 from the 'Call-info' header.

In operation 510, the calling electronic device 1100 may determine whether contact information corresponding to the contact information obtained from the response message is included in the contacts of the calling electronic device 1100. The calling electronic device 1100 may determine whether contact information corresponding to the contact information of the second called electronic device 1300 receiving the forwarded call is included in the contacts of the calling electronic device 1100. For example, the calling electronic device 1100 determines whether contact information corresponding to at least one of the phone number of the second called electronic device 1300, the user name of the second called electronic device 1300 or the user nickname of the second called electronic device 1300 is included in the contacts of the calling electronic device 1100.

If determining that the contact information corresponding to the contact information obtained from the response message is not included in the contacts of the calling electronic device 1100 in operation 510, the calling electronic device 1100 may display the contact information obtained from the response message on the outgoing call screen in operation 540.

If determining that the contact information corresponding to the contact information obtained from the response message is included in the contacts of the calling electronic device 1100 in operation 510, the calling electronic device 1100 may identify contact information corresponding to the contact information obtained from the response message from the calling electronic device 1100 in the contacts in operation 520.

In operation 530, the calling electronic device 1100 may display the contact information identified from the contacts of the calling electronic device 1100 on the outgoing call screen. In so doing, based on the contact information included in the contacts of the calling electronic device 1100, the calling electronic device 1100 may display information indicating that the call from the calling electronic device 1100 is forwarded by the first called electronic device 1200 and transmitted to the second called electronic device 1300, on the outgoing call screen.

Figure 6:
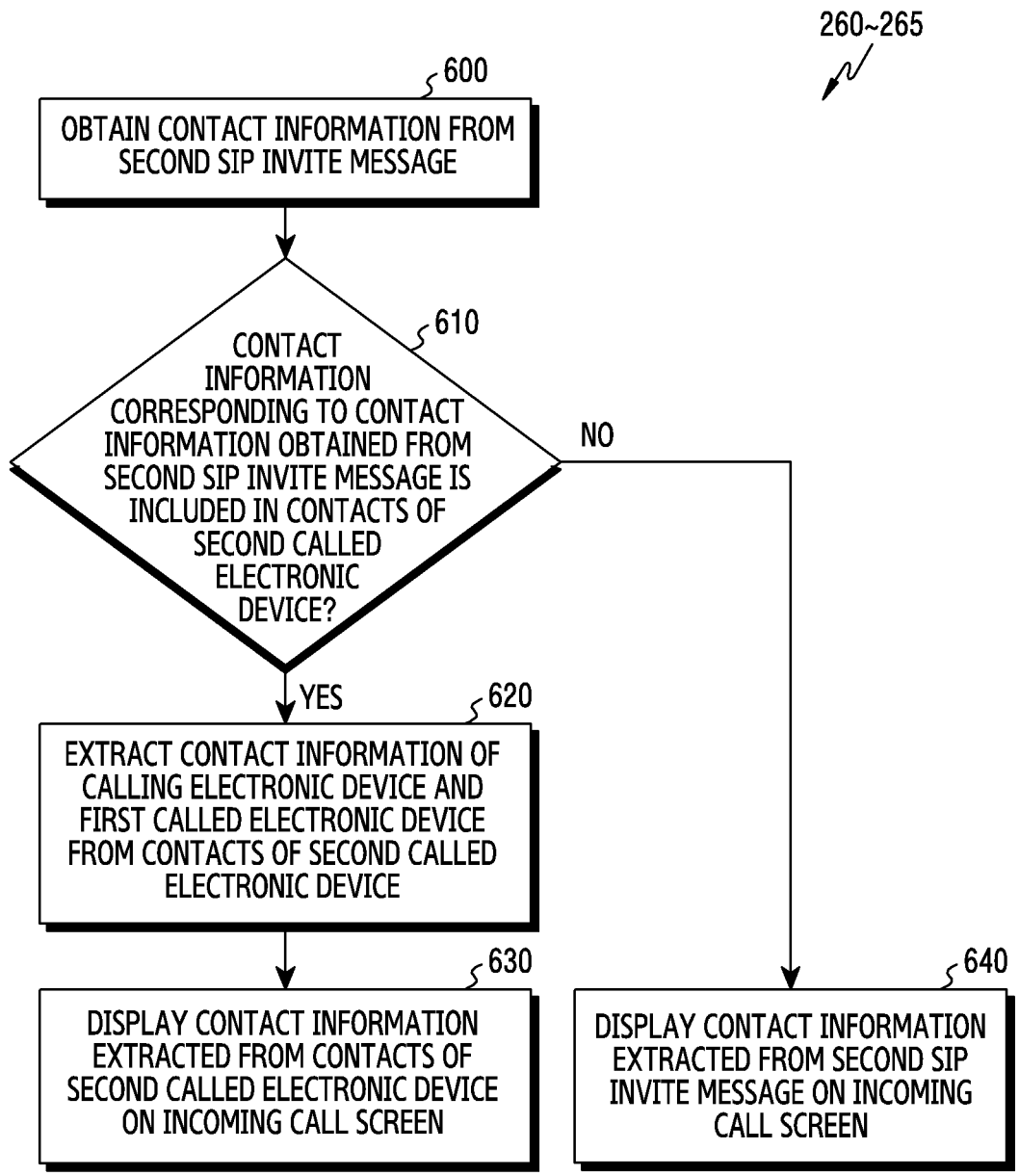
FIG. 6 is a flowchart of a method of a second called electronic device for displaying contact information related to a forwarded call on an incoming call screen by utilizing contacts stored in an electronic device according to an embodiment of the disclosure.

FIG. 6 is a flowchart of a method of a second called electronic device for displaying contact information related to a forwarded call on an incoming call screen by utilizing contacts stored in the electronic device according to an embodiment of the disclosure. Operation 600 through operation 640 of FIG. 6 may correspond to operation 260 through operation 265 of FIG. 2.

Referring to FIG. 6, in operation 600, the second called electronic device 1300 may obtain the contact information from the second SIP invite message. The second called electronic device 1300 may obtain the contact information related to the call forwarding from the header recording the contact information included in the second SIP invite message. For example, the second called electronic device 1300 identifies at least one of the phone number of the calling electronic device 1100, the user name of the calling electronic device 1100 or the user nickname of the calling electronic device 1100 from the 'Call-info' header.

In operation 610, the second called electronic device 1300 may determine whether contact information corresponding to the contact information obtained from the second SIP invite message is included in the contacts of the second called electronic device 1300. The second called electronic device 1300 may determine whether the contact information corresponding to the contact information of the calling electronic device 1100 is included in the contacts of the second called electronic device 1300. For example, the second called electronic device 1300 determines whether the contact information corresponding to at least one of the phone number of the calling electronic device 1100, the user name of the calling electronic device 1100 or the user nickname of the calling electronic device 1100 is included in the contacts of the second called electronic device 1300.

If determining that the contact information corresponding to the contact information obtained from the second SIP invite message is not included in the contacts of the second called electronic device 1300 in operation 610, the second called electronic device 1300 may display the contact information obtained from the second SIP invite message on the incoming call screen in operation 640.

If determining that the contact information corresponding to the contact information obtained from the second SIP invite message is included in the contacts of the second called electronic device 1300 in operation 610, the second called electronic device 1300 may identify contact information corresponding to the contact information obtained from the second SIP invite message from the contacts of the second called electronic device 1300 in operation 620.

In operation 630, the second called electronic device 1300 may display the contact information identified from the contacts of the second called electronic device 1300 on the incoming call screen. In so doing, based on the contact information included in the contacts of the second called electronic device 1300, the second called electronic device 1300 may display information indicating that the call from the calling electronic device 1100 is forwarded by the first called electronic device 1200 and transmitted to the second called electronic device 1300, on the incoming call screen.

Figure 7:
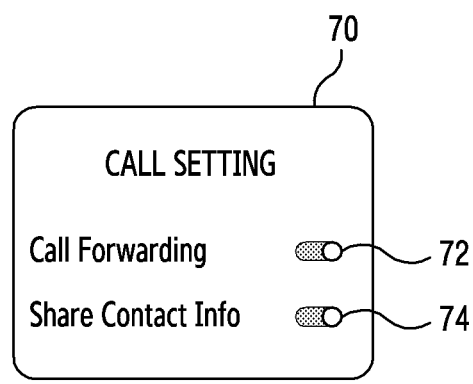
FIG. 7 is a diagram of a graphical user interface (GUI) example for setting call forwarding according to an embodiment of the disclosure.

FIG. 7 is a diagram of a GUI example for setting call forwarding according to an embodiment of the disclosure.

Referring to FIG. 7, a GUI 70 for setting the call forwarding may include a button 72 for enabling/disabling the call forwarding function and a button 74 for enabling/disabling the contact information sharing function.

The GUI 70 for setting the call forwarding may be displayed on the screen of the first called electronic device 1200. The call forwarding function of the first called electronic device 1200 may be enabled/disabled based on a user input for the button 72 of the GUI 70 displayed on the screen of the first called electronic device 1200. The contact information sharing function of the first called electronic device 1200 may be enabled/disabled based on a user input for the button 74 displayed on the screen of the first called electronic device 1200.

FIG. 8 is a diagram of a response message example including contact information and call blocking information according to an embodiment of the disclosure.

Referring to FIG. 8, a response message 80 may include the contact information related to the call forwarding and the call blocking information. The response message 80 includes, for example, a 'Via' header, a 'From' header, a 'To' header, a 'Call-ID' header, a 'CSeq' header, a 'Contact' header, a 'Content-length' header and a 'Call-info' header. The first called electronic device 1200 may generate the response message 80 including the contact information, by adding the 'Call-info header which is a separate header recording the contact information to the response message 80. For example, a value corresponding to the 'Call-info' header includes the contact information (e.g., "contactA") of the calling electronic device 1100, the contact information (e.g., "contactB") of the first called electronic device 1200 and the contact information (e.g., "contactC") of the second called electronic device 1300.

For example, the response message 80 further includes the call blocking information. For example, the value corresponding to the 'Call-info' header added to the response message 80 further includes the call blocking information (e.g., "block_status: true") indicating whether the calling electronic device 1100 is blocked.

FIG. 9 is a diagram of a second SIP invite message example including contact information and call blocking information according to an embodiment of the disclosure.

Referring to FIG. 9, a second SIP invite message 90 may include the contact information related to the call forwarding and the call blocking information. The second SIP invite message 90 includes, for example, a 'Via' header, a 'From' header, a 'To' header, a 'Call-ID' header, a 'CSeq' header, a 'Contact' header, a 'Content-length' header and a 'Call-info' header. The server 2000 may generate the second SIP invite message 90 including the contact information, by adding a separate header recording the contact information to the second SIP invite message 90. For example, a value corresponding to the 'Call-info' header includes the contact information (e.g., "contactA") of the calling electronic device 1100, the contact information (e.g., "contactB") of the first called electronic device 1200 and the contact information (e.g., "contactC") of the second called electronic device 1300.

For example, the second SIP invite message 90 further includes the call blocking information. For example, the value corresponding to the 'Call-info' header added to the second SIP invite message 90 further includes the call blocking information (e.g., "block_status: true") indicating whether the calling electronic device 1100 is blocked.

Figure 10:
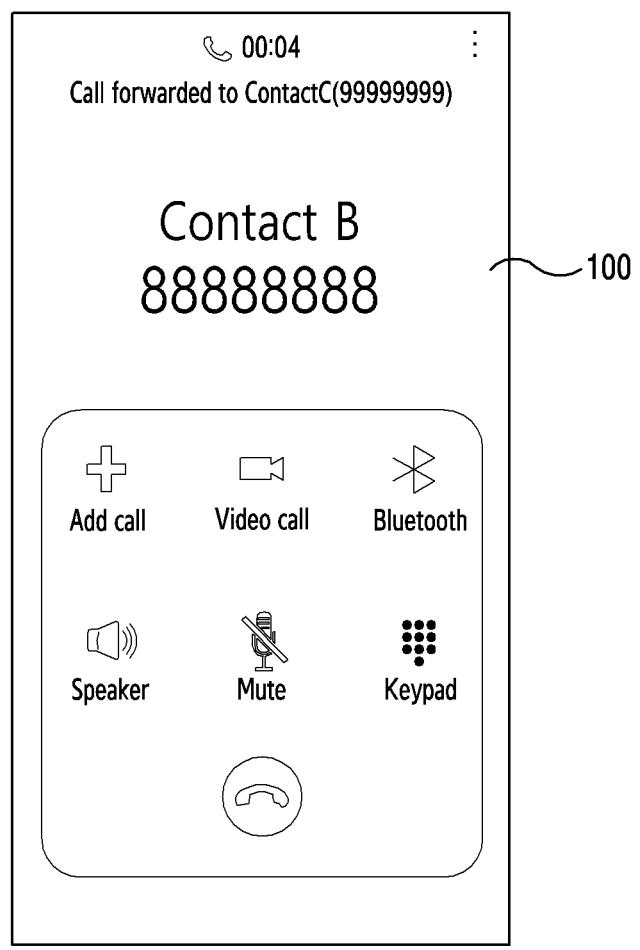
FIG. 10 is a diagram of an example of displaying call forwarding information on an outgoing call screen of a calling electronic device according to an embodiment of the disclosure.

FIG. 10 is a diagram of an example of displaying call forwarding information on an outgoing call screen of a calling electronic device according to an embodiment of the disclosure.

Referring to FIG. 10, an outgoing call screen 100 of the calling electronic device 1100 may display information indicating that a call from the calling electronic device 1100 is forwarded to the second called electronic device 1300.

The outgoing call screen 100 of the calling electronic device 1100 may display the user name (e.g., "contact B") and the phone number (e.g., "88888888") of the first called electronic device 1200.

In addition, the outgoing call screen 100 of the calling electronic device 1100 may display a phrase (e.g., "Call forwarded to Contact C(99999999)") indicating that the call of the calling electronic device 1100 is forwarded to the second called electronic device 1300. The phrase indicating that the call from the calling electronic device 1100 is forwarded to the second called electronic device 1300 may include the name (e.g., "contact B") of the second called electronic device 1300 and the phone number (e.g., "99999999") of the second called electronic device 1300.

Figure 11:
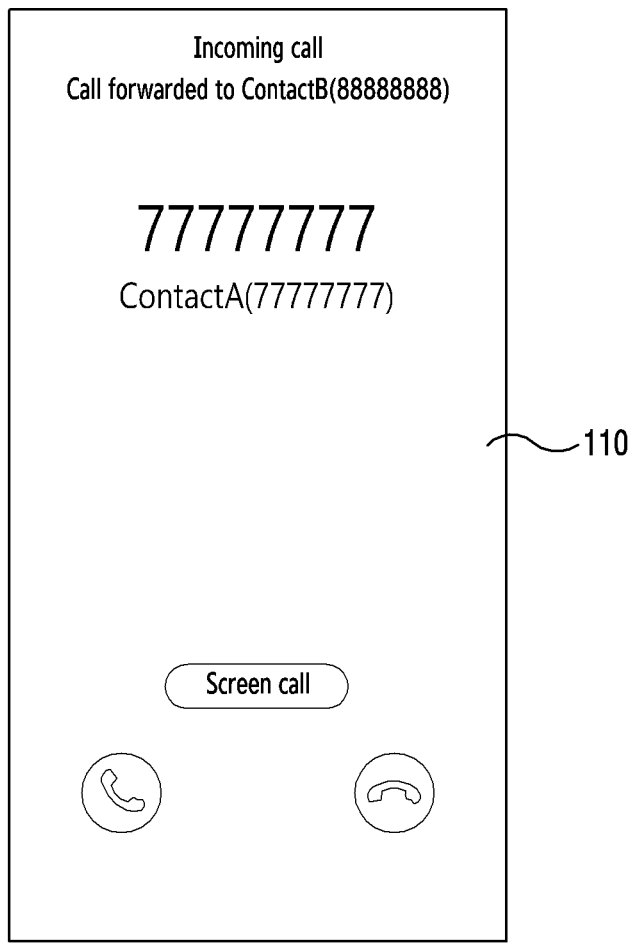
FIG. 11 is a diagram of an example of displaying call forwarding information on an incoming call screen of a second called electronic device according to an embodiment of the disclosure.

FIG. 11 is a diagram of an example of displaying call forwarding information on an incoming call screen of a second called electronic device according to an embodiment of the disclosure.

Referring to FIG. 11, an incoming call screen 110 of the second called electronic device 1300 may display information indicating that a call from the calling electronic device 1100 is forwarded by the first called electronic device 1200 to the second called electronic device 1300.

The incoming call screen 110 of the second called electronic device 1300 may display the user name (e.g., "Contact A") and the phone number (e.g., "7777777") of the calling electronic device 1100.

In addition, the incoming call screen 110 of the second called electronic device 1300 may display a phrase (e.g., "Call forwarded by Contact B(88888888)") indicating that the call of the calling electronic device 1100 is forwarded by the first called electronic device 1200 to the second called electronic device 1300. The phrase indicating that the call of the calling electronic device 1100 is forwarded by the first called electronic device 1200 to the second called electronic device 1300 may include the name (e.g., "Contact A") of the first called electronic device 1200 and the phone number (e.g., "88888888") of the first called electronic device 1200.

FIG. 12 is a diagram of an example of call forwarding history information stored in a calling electronic device and displayed on a screen of the calling electronic device according to an embodiment of the disclosure.

Referring to FIG. 12, a call forwarding history table 120 stored in the calling electronic device 1100 may include a field 122 recording a type of the forwarded call, a field 123 recording an electronic device which forwards the call, a field 124 recording an electronic device which originates the call and a field 125 recording an electronic device which receives the forwarded call. For example, the field 122 contains "OUTGOING" indicating that the type of the forwarded call is a call originated by the calling electronic device 1100, the field 123 may contain "CONTACT B" which is the user name of the first called electronic device 1200 forwarding the call, the field 124 may contain a value "NULL", and the field 125 may contain "CONTACT C" which is the name of the second called electronic device 1300 receiving the forwarded call.

Based on the call forwarding history table 120, the calling electronic device 1100 may display history information 127 of the forwarded call on the screen. For example, as the forwarded call history information 127, the calling electronic device 1100 displays a phrase "Outgoing call" indicating that the forwarded call is the originated call, a phrase "Call forwarded to Contact C" indicating that the call is forwarded to the second called electronic device 1300, "99999999" which is the phone number of the second called electronic device 1300, and "10:34" which is an outgoing call time.

According to an embodiment, for example, if the user name of the first called electronic device 1200 is Contact B, the history information 127 of the call forwarded by the user Contact B of the first called electronic device 1200 is displayed on the outgoing call screen of the calling electronic device 1100, while the calling electronic device 1100 makes the call to the first called electronic device 1200.

Figure 13:
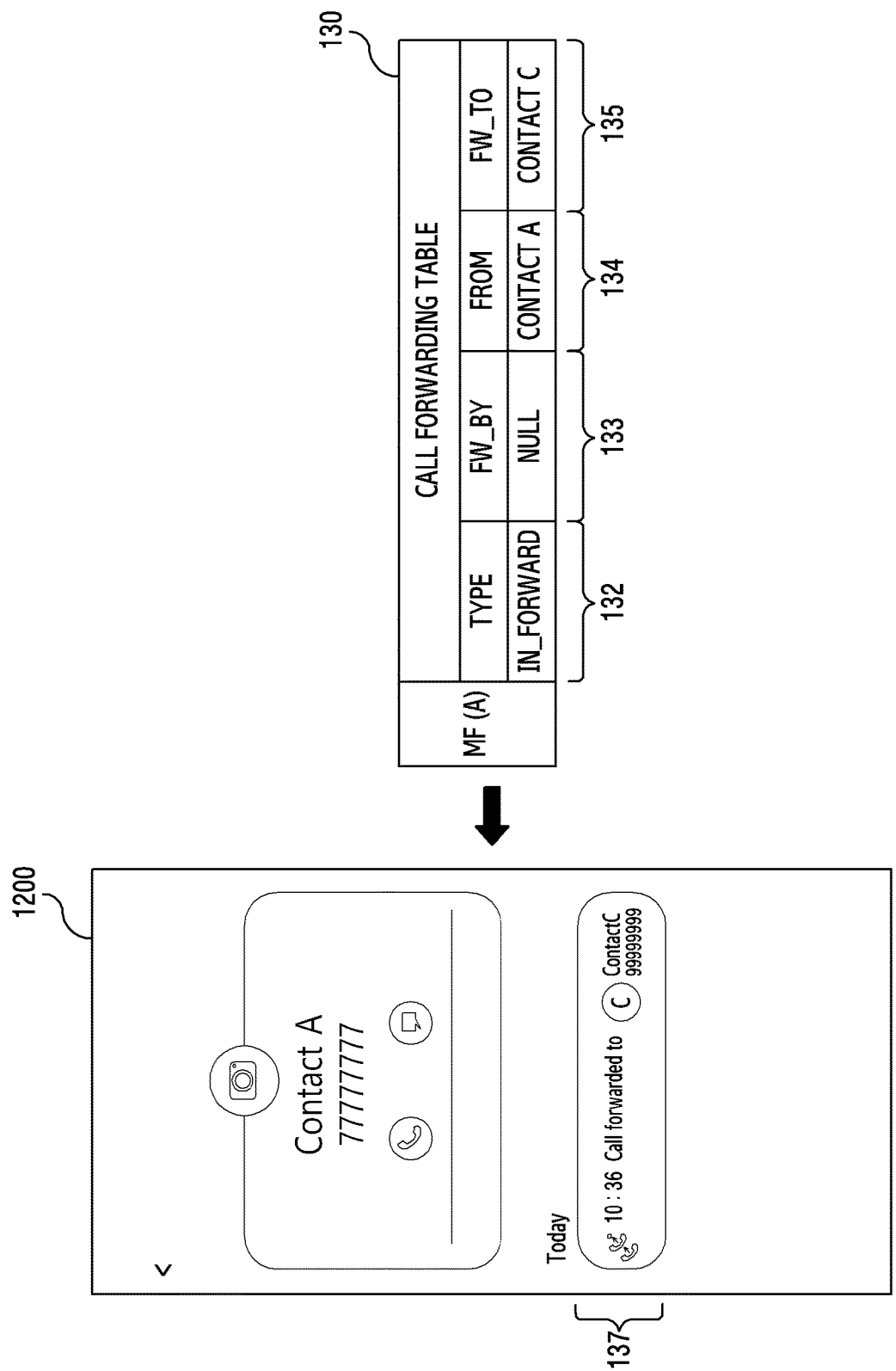
FIG. 13 is a diagram of an example of call forwarding history information stored in a first called electronic device and displayed on a screen of the first called electronic device according to an embodiment of the disclosure.

FIG. 13 is a diagram of an example of call forwarding history information stored in a first called electronic device and displayed on a screen of the first called electronic device according to an embodiment of the disclosure.

Referring to FIG. 13, a call forwarding history table 130 stored in the first called electronic device 1200 may include a field 132 recording the type of the forwarded call, a field 133 recording an electronic device which forwards the call, a field 134 recording an electronic device which originates the call and a field 135 recording an electronic device which receives the forwarded call. For example, the field 132 contains "IN-FORWARDING" indicating that the type of the forwarded call is a call forwarded by the first called electronic device 1200, the field 133 contains a value "NULL", the field 134 contains "CONTACT A" which is the user name of the calling electronic device 1100 originating the call, and the field 135 contains "CONTACT C" which is the name of the second called electronic device 1300 receiving the forwarded call.

Based on the call forwarding history table 130, the first called electronic device 1200 display history information 137 of the forwarded call on the screen. For example, as the forwarded call history information 137, the first called electronic device 1200 displays a phrase "Call forwarded to Contact C" indicating that the call is forwarded to the second called electronic device 1300, "99999999" which is the phone number of the second called electronic device 1300, and "10:36" which is a call forwarding time.

According to an embodiment, for example, if the user name of the calling electronic device 1100 is Contact A, the call forwarding history information 137 of the call from the calling electronic device 1100 is displayed on the incoming call screen of the first called electronic device 1200, while the first called electronic device 1200 receives the call request from the calling electronic device 1100.

Figure 14:
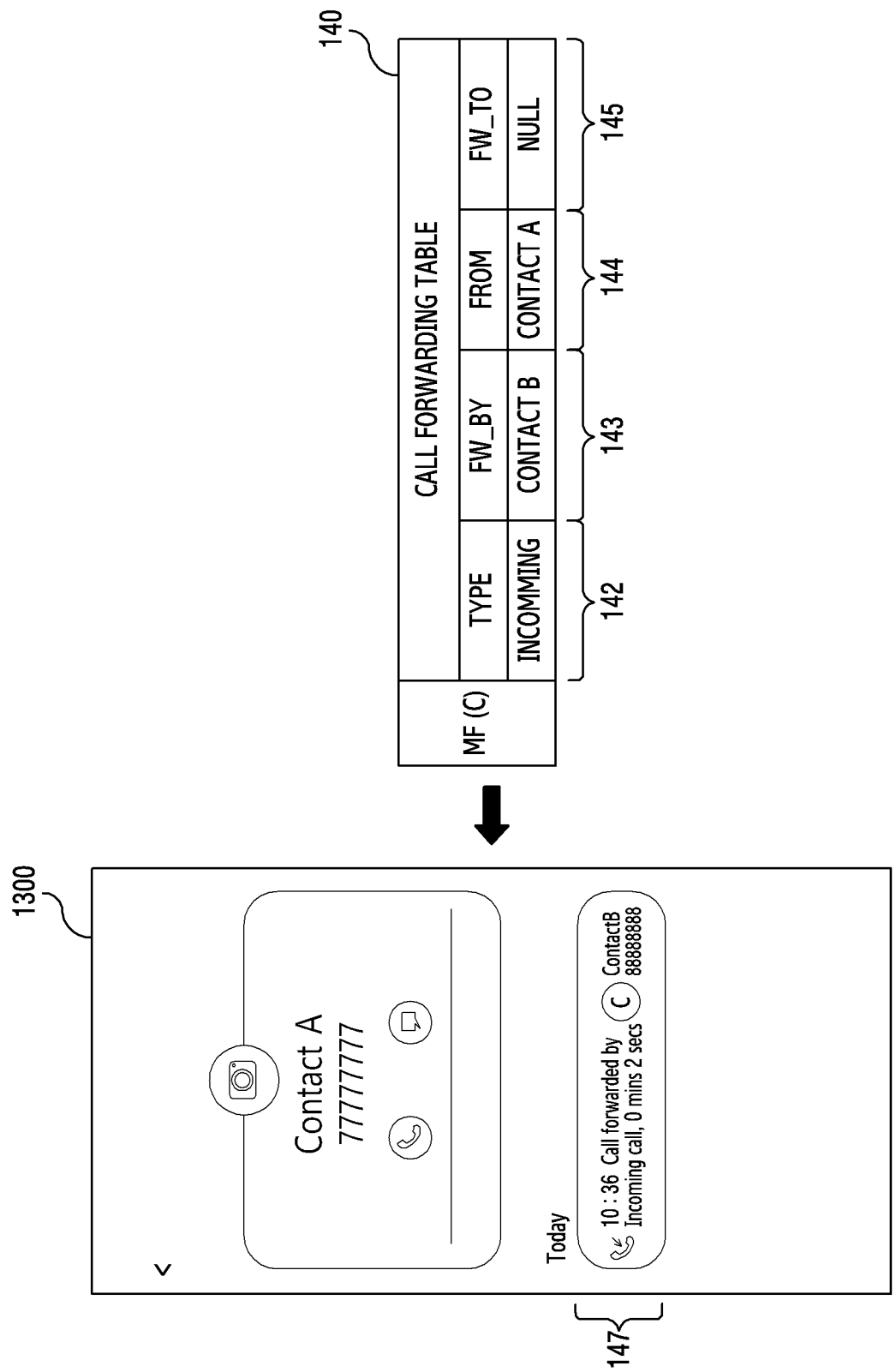
FIG. 14 is a diagram of an example of call forwarding history information stored in a second called electronic device and displayed on a screen of the second called electronic device according to an embodiment of the disclosure.

FIG. 14 is a diagram of an example of call forwarding history information stored in a second called electronic device and displayed on a screen of the second called electronic device according to an embodiment of the disclosure.

Referring to FIG. 14, a call forwarding history table 140 stored in the second called electronic device 1300 may include a field 142 recording the type of the forwarded call, a field 143 recording an electronic device which forwards the call, a field 144 recording an electronic device which originates the call and a field 145 recording an electronic device which receives the forwarded call. For example, the field 142 contains "INCOMING" indicating that the type of the forwarded call is a call forwarded to the second called electronic device 1300, the field 143 contains "CONTACT B" which is the user name of the first called electronic device 1200 forwarding the call, the field 144 contains "CONTACT A" which is the user name of the electronic device 1100 originating the call, and the field 145 contains a value "NULL".

Based on the call forwarding history table 140, the second called electronic device 1300 may display history information 147 of the forwarded call on the screen. For example, as the forwarded call history information 147, the second called electronic device 1300 displays on the screen, a phrase "INCOMING" indicating that the forwarded call is the call received at the second called electronic device 1300, a phrase "Call forwarded by Contact B" indicating that the call is forwarded by the first called electronic device 1200, "88888888" which is the phone number of the first called electronic device 1200, and "10:36" which is a time at which the forwarded call is received.

According to an embodiment, for example, if the user name of the calling electronic device 1100 is Contact A, the call forwarding history information 147 is displayed on the incoming call screen of the second called electronic device 1300, while the second called electronic device 1300 receives the forwarded call from the calling electronic device 1100.

FIGS. 12, 13, and 14 have described that the calling electronic device 1100, the first called electronic device 1200 and the second called electronic device 1300 each generate the call forwarding history information, but it is not limited thereto. For example, at least one of the calling electronic device 1100, the first called electronic device 1200 and the second called electronic device 1300 do not generate the call forwarding history information, wherein an electronic device not generating the call forwarding history information may receive from the server 2000 and use the history information generated by the server 2000. In this case, the call forwarding history table of the server 2000 may include a field recording the type of the forwarded call, a field recording the call forwarding electronic device, a field recording the call originating electronic device and a field recording the electronic device which receives the forwarded call. In addition, a valid value other than the value "null" may be recorded in every field of the call forwarding history table by the server 2000.

Figure 15:
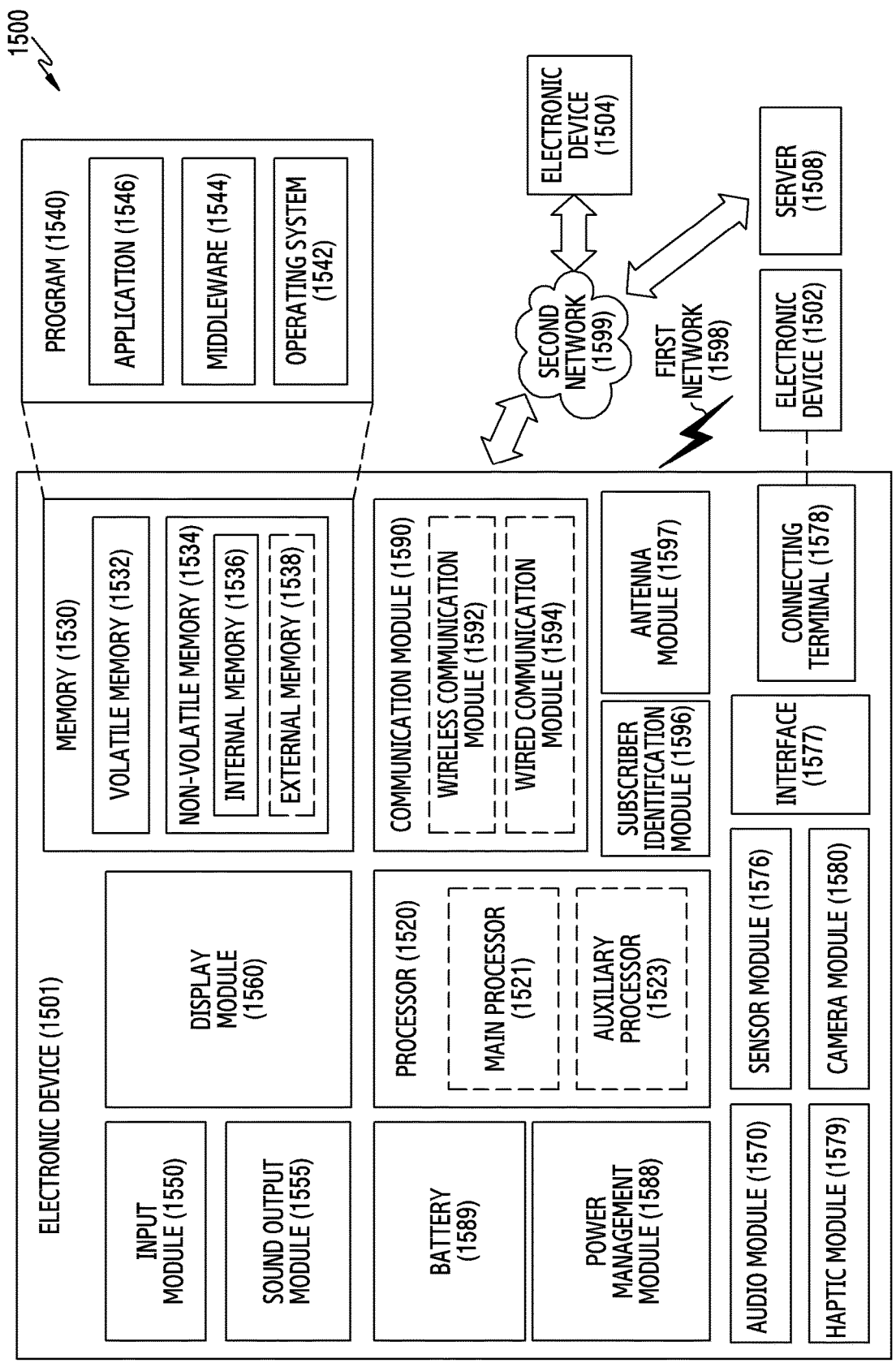
FIG. 15 is a block diagram of an electronic device in a network environment, according to an embodiment of the disclosure.

FIG. 15 is a block diagram illustrating an electronic device 1501 in a network environment 1500 according to an embodiment of the disclosure.

Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 executes, for example, software (e.g., a program 1540) to control at least one other component (e.g., a hardware or software component) of the electronic device 1501 coupled with the processor 1520, and performs various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 is adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data includes, for example, software (e.g., the program 1540) and input data or output data for a command related thereto. The memory 1530 may include the volatile memory 1532 or the non-volatile memory 1534.

The program 1540 may be stored in the memory 1530 as software, and includes, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 includes, for example, a microphone, a mouse, a keyboard, a key (e.g., a button), or a digital pen (e.g., a stylus pen).

The sound output module 1555 may output sound signals to the outside of the electronic device 1501. The sound output module 1555 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 includes, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 includes, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 includes, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 includes, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 includes, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™ wireless-fidelity (Wi-Fi) direct, or infrared data association (IrDA)) or the second network 1599 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter wave (mmWave) band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, is selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502 or 1504, or the server 1508. For example, if the electronic device 1501 should perform a function or a service automatically, or in response to a request from a user or another device, the electronic device 1501, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra-low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device 1501 of FIG. 15 may be the calling electronic device 1100, the first called electronic device 1200 or the second called electronic device 1300, and the server 1508 may be the server 2000 of FIG. 1.

According to an embodiment, if the electronic device 1501 of FIG. 15 is the calling electronic device 1100, the electronic device 1501 may perform the operations of the calling electronic device 1100 of FIGS. 1 through 14.

In this case, the electronic device 1501 may generate a first SIP invite message. The electronic device 1501 may generate the first SIP invite message for a call with the first called electronic device 1200, and the first SIP invite message may include an ID value of the electronic device 1501 and an ID value of the first called electronic device 1200. The SIP invite message includes, for example, but not limited to, the phone number of the electronic device 1501 and the phone number of the first called electronic device 1200.

The electronic device 1501 may transmit the first SIP invite message to the server 2000, and receive a response message including contact information generated by the first called electronic device 1200 from the server 2000.

The electronic device 1501 may extract the contact information from the response message. The electronic device 1501 may extract the contact information included in the response message, and identify from the extracted contact information, that the first called electronic device 1200 is trying to forward the call to the second called electronic device 1300. For example, the electronic device 1501 obtains from the response message, contact information of the first called electronic device 1200 which forwards the call and contact information of the second called electronic device 1300 which is to receive the forwarded call.

The electronic device 1501 may display the contact information on the outgoing call screen. The electronic device 1501 may display the outgoing call screen after transmitting the first SIP invite message for the call with the first called electronic device 1200, and if receiving the response message including the contact information from the server 2000 while displaying the outgoing call screen, display the contact information obtained from the received response message on the outgoing call screen. For example, the electronic device 1501 displays on the outgoing call screen, a text indicating that the call to the first called electronic device 1200 is forwarded by the first called electronic device 1200 to the second called electronic device 1300.

The electronic device 1501 may receive a SIP response code (e.g., 200 OK) from the second called electronic device 1300, from the server 2000. The SIP response code (e.g., 200 OK) may request call connection with the electronic device 1501.

The electronic device 1501 may establish an RTP session for the call with the second called electronic device 1300. As the RTP session is established, the electronic device 1501 may perform the call with the second called electronic device 1300.

The electronic device 1501 may generate history information of the call forwarding. The call forwarding history information generated by the electronic device 1501 includes, for example, the contact information of the first called electronic device 1200, the contact information of the second called electronic device 1300, the information indicating that the electronic device 1501 originates the call, the information indicating that the first called electronic device 1200 forwards the call, and the information indicating that the second called electronic device 1300 receives the forwarded call.

According to an embodiment, the electronic device 1501 may obtain the contact information from the response message. The electronic device 1501 may obtain the contact information related to the call forwarding from a header recording the contact information included in the response message. For example, the electronic device 1501 identifies at least one of a phone number of the second called electronic device 1300, a user name of the second called electronic device 1300 or a user nickname of the second called electronic device 1300, from the 'Call-info' header.

The electronic device 1501 may determine whether contact information corresponding to the contact information obtained from the response message is included in contacts of the electronic device 1501. The electronic device 1501 may determine whether contact information corresponding to the contact information of the second called electronic device 1300 which receives the forwarded call is included in the contacts of the electronic device 1501. For example, the electronic device 1501 determines whether the contact information corresponding to at least one the phone number of the second called electronic device 1300, the user name of the second called electronic device 1300 or the user nickname of the second called electronic device 1300 is included in the contacts of the electronic device 1501.

If determining whether the contact information corresponding to the contact information obtained from the response message is not included in the contacts of the electronic device 1501, the electronic device 1501 may display the contact information obtained from the response message on the outgoing call screen.

If determining whether the contact information corresponding to the contact information obtained from the response message is included in the contacts of the electronic device 1501, the electronic device 1501 may identify contact information corresponding to the contact information obtained from the response message from the contacts of the electronic device 1501.

The electronic device 1501 may display the contact information identified from the contacts of the electronic device 1501 on the outgoing call screen. In so doing, based on the contact information included in the contacts of the electronic device 1501, the electronic device 1501 may display information indicating that the call from the electronic device 1501 is forwarded by the first called electronic device 1200 to the second called electronic device 1300, on the outgoing call screen.

Meanwhile, according to an embodiment, if the electronic device 1501 of FIG. 15 is the first called electronic device 1200, the electronic device 1501 may perform the operations of the first called electronic device 1200 of FIGS. 1 through 14.

In this case, the electronic device 1501 may receive the first SIP invite message generated by the calling electronic device 1100, from the server 2000. The electronic device 1501 may determine whether to forward the call from the calling electronic device 1100. According to an embodiment, during a call with other electronic device (not shown), the electronic device 1501 may determine whether to forward the call from the calling electronic device 1100. For example, if receiving a first invite message from the server 2000 during the call with other electronic device (not shown), the electronic device 1501 determines to forward the call from the calling electronic device 1100.

According to an embodiment, if receiving a user input for not performing the call with the calling electronic device 1100, the electronic device 1501 may determine to forward the call from the calling electronic device 1100. For example, if the electronic device 1501 receiving the first invite message receives a user input for rejecting the call or a user input for forwarding the call, the electronic device 1501 determines to forward the call from the calling electronic device 1100.

According to an embodiment, if satisfying a condition which is preset by the user for the call forwarding, the electronic device 1501 may determine to forward the call from the calling electronic device 1100. For example, if a phone number for the call forwarding is preset and the electronic device 1501 receives the first invite message from the calling electronic device 1100 having the preset phone number, the electronic device 1501 determines to forward the call from the calling electronic device 1100. In this case, the preset phone number may be, but not limited to, a phone number selected by the user for the call forwarding or a phone number call-blocked by the user. For example, if the electronic device 1501 is configured to forward its every call and receives a first invite message from the calling electronic device 1100, the electronic device 1501 determines to forward the call from the calling electronic device 1100.

If determining not to forward the call from the calling electronic device 1100, the electronic device 1501 may perform the call with the calling electronic device 1100. For example, the electronic device 1501 provides '180: ringing' code and '200 OK' code to the calling electronic device 1100 via the server 2000, and establish an RTP session with the calling electronic device 1100.

If determining to forward the call from the calling electronic device 1100, the electronic device 1501 may obtain contact information. The contact information may include the ID value of the electronic device for the call connection, for example, but not limited to, the phone number of the electronic device, the user name of the electronic device and the user nickname of the electronic device.

According to an embodiment, based on the phone number of the calling electronic device 1100 in the first invite message, the electronic device 1501 may obtain the contact information of the calling electronic device 1100. For example, the electronic device 1501 obtains the contact information corresponding to the calling electronic device 1100 from a user's phonebook of the electronic device 1501. The user's phonebook may be stored in the electronic device 1501 or another server (not shown). The contact information of the calling electronic device 1100 includes, for example, but not limited to, the phone number of the calling electronic device 1100, the user name and the nickname of the calling electronic device 1100.

According to an embodiment, the electronic device 1501 may obtain the contact information of the second called electronic device 1300 for receiving the forwarded call. In this case, for example, the electronic device 1501 presets the second called electronic device 1300 for receiving the forwarded call, and obtain the contact information of the second called electronic device 1300 which is preset. Alternatively, for example, the electronic device 1501 displays a GUI for selecting the second called electronic device 1300 for receiving the forwarded call, and select the second called electronic device 1300 based on a user input for the GUI. The electronic device 1501 may obtain the contact information of the second called electronic device 1300 selected by the user from the user's phonebook. The contact information of the second called electronic device 1300 may include, for example, but not limited to, the phone number of the second called electronic device 1300, the user name and the nickname of the second called electronic device 1300.

According to an embodiment, the electronic device 1501 may obtain the contact information of the electronic device 1501 which forwards the call. The contact information of the electronic device 1501 includes, for example, but not limited to, the phone number of the electronic device 1501, the user name and the nickname of the electronic device 1501.

The electronic device 1501 may generate a response message including the contact information. The response message including the contact information includes, for example, a 'Via' header, a 'From' header, a 'To' header, a 'Call-ID' header, a 'CSeq' header, a 'Contact' header, a 'Content-length' header and a 'Call-info' header. The electronic device 1501 may generate the response message including the contact information, by adding a separate header where the contact information is recorded, to the response message. For example, the electronic device 1501 generates the response message including the contact information by adding to the response message the 'Call-info' header where the contact information is recorded. In this case, the response message generated by the electronic device 1501 may include, as a value corresponding to the 'Call-info' header, the contact information of the calling electronic device 1100, the contact information of the electronic device 1501 and the contact information of the second called electronic device 1300.

For example, the electronic device 1501 generates the response message further including the call blocking information. The call blocking information may include a value indicating whether the call from the calling electronic device 1100 is blocked by the electronic device 1501. In this case, the response message may include, as the value corresponding to the 'Call-info' header, the call blocking information indicating whether the calling electronic device 1100 is blocked.

The electronic device 1501 may transmit the response message to the server 2000.

The electronic device 1501 may generate the call forwarding history information. The call forwarding history information generated by the electronic device 1501 includes, for example, the contact information of the calling electronic device 1100, the contact information of the second called electronic device 1300, information indicating that the calling electronic device 1100 originates the call, information indicating that the electronic device 1501 forwards the call, and information indicating that the second called electronic device 1300 receives the forwarded call.

According to an embodiment, the electronic device 1501 may obtain the phone number of the calling electronic device 1100 from the first SIP invite message. The electronic device 1501 may obtain the phone number of the calling electronic device 1100 contained in the first SIP invite message, from the first SIP invite message.

The electronic device 1501 may determine whether the call forwarding function is enabled. The electronic device 1501 may preset whether to enable the call forwarding function, and determine whether the call forwarding function is enabled, based on the setting. In this case, the electronic device 1501 may enable the call forwarding function according to a user input through the GUI for enabling the call forwarding function. If the call forwarding function of the electronic device 1501 is not enabled, in response to receiving the first SIP invite message, the electronic device 1501 may display the GUI for enabling the call forwarding function and receive a user input for the GUI.

The electronic device 1501 may enable the call forwarding function for each phone number of the calling electronic device 1100. In this case, the electronic device 1501 may determine whether the call forwarding function is enabled for the calling electronic device 1100, based on the phone number of the calling electronic device 1100.

If determining that the call forwarding function is not enabled, the electronic device 1501 may terminate the call forwarding operation.

If determining that the call forwarding function is enabled, the electronic device 1501 may determine whether the contact information sharing function is enabled. The contact information sharing function may be a function for sharing the contact information related to the call forwarding, with at least one of the calling electronic device 1100, the server 2000 and the second called electronic device 1300 if the electronic device 1501 performs the call forwarding.

The electronic device 1501 may preset whether to enable the contact information sharing function, and determine based on the setting whether the contact information sharing function is enabled. In this case, the first called electronic device 1200 may enable the contact information sharing function according to a user input through the GUI for enabling the contact information sharing function. If the contact information sharing function of the electronic device 1501 is not enabled, in response to receiving the first SIP invite message, the electronic device 1501 may display the GUI for enabling the contact information sharing function and receive a user input for the GUI.

The electronic device 1501 may enable the contact information sharing function for each phone number of the calling electronic device 1100. In so doing, the electronic device 1501 may determine whether the contact information sharing function is enabled for the calling electronic device 1100, based on the phone number of the calling electronic device 1100.

If determining that the contact information sharing function is not enabled, the electronic device 1501 may generate a response message without adding the call forwarding contact information. For example, the electronic device 1501 generates the response message not including the separate header containing the contact information to be displayed on the outgoing call screen of the calling electronic device 1100 and the incoming call screen of the second called electronic device 1300. For example, the electronic device 1501 generates the response message not including the 'Call-info' header where the contact information is recorded.

If determining that the contact information sharing function is enabled, the electronic device 1501 may generate the call blocking information indicating whether to block a call from the calling electronic device 1100. For example, if the phone number of the calling electronic device 1100 is set to be blocked by the electronic device 1501, the electronic device 1501 generates the call blocking information indicating that the call from the calling electronic device 1100 is blocked. Alternatively, for example, if the phone number of the calling electronic device 1100 is not set to be blocked by the electronic device 1501, the electronic device 1501 generates the call blocking information indicating that the call from the calling electronic device 1100 is not blocked.

The electronic device 1501 may select the second called electronic device 1300. The electronic device 1501 may select the second called electronic device 1300 as the electronic device for receiving the forwarded call, based on a preset criterion. If the second called electronic device 1300 for receiving the forwarded call is preset, the electronic device 1501 may select the second called electronic device 1300 according to the setting. In this case, for example, the second called electronic device 1300 for receiving the forwarded call may be preset, for each calling electronic device 1100. Alternatively, for example, the electronic device for receiving the forwarded call is set to the second called electronic device 1300 with respect to every call requested from the electronic device 1501. Alternatively, for example, the second called electronic device 1300 is preset regardless of the phone number of the calling electronic device 1100.

According to an embodiment, the electronic device 1501 may select the second called electronic device 1300 according to a user input. The electronic device 1501 receiving the first SIP invite message may display a list for selecting the second called electronic device 1300, and select the second called electronic device 1300 for receiving the forwarded call, according to the user input for the list. For example, the electronic device 1501 displays a GUI inquiring whether to forward the call and a GUI for selecting the second called electronic device 1300 to the receive the forwarded call, on the incoming call screen indicating whether the call from the calling electronic device 1100 is requested, and select the second called electronic device 1300 based on user inputs through the GUIs.

The electronic device 1501 may determine to perform the call with the calling electronic device 1100, based on a status of the electronic device 1501. For example, if the electronic device 1501 is engaged in a call, the electronic device 1501 does not respond, the electronic device 1501 is in absence, or the electronic device 1501 receive a user input for rejecting the call connection, the electronic device 1501 determines not to perform the call with the calling electronic device 1100. Alternatively, for example, if receiving a user input for accepting the call from the calling electronic device 1100, the electronic device 1501 determines to perform the call with the calling electronic device 1100.

If determining to perform the call with the calling electronic device 1100, the electronic device 1501 may terminate the call forwarding operation.

If determining not to perform the call with the calling electronic device 1100, the electronic device 1501 may generate a response message including the contact information related to the call forwarding and the call blocking information.

Meanwhile, according to an embodiment, if the electronic device 1501 of FIG. 15 is the second called electronic device 1300, the electronic device 1501 may perform the operations of the second called electronic device 1300 of FIGS. 1 through 14. The electronic device 1501 may receive the second SIP invite message generated by the server 2000, from the server 2000.

The electronic device 1501 may extract the contact information from the second SIP invite message. The electronic device 1501 may extract the contact information from the response message, and identify from the extracted contact information whether the first called electronic device 1200 tries to forward the call to the electronic device 1501. For example, the electronic device 1501 obtains the contact information of the calling electronic device 1100 which attempts the call to the first called electronic device 1200 and the contact information of the first called electronic device 1200 which forwards the call, from the response message.

The electronic device 1501 may display the contact information on the incoming call screen. If receiving the second SIP invite message from the server 2000, the electronic device 1501 may display the incoming call screen indicating that the forwarded call is incoming. The electronic device 1501 may display the contact information obtained from the received second SIP invite message on the incoming call screen. For example, the electronic device 1501 displays a text indicating that the call from the calling electronic device 1100 to the first called electronic device 1200 is forwarded by the first called electronic device 1200 to the electronic device 1501, on the incoming call screen.

The electronic device 1501 may generate the call forwarding history information. The call forwarding history information generated by the electronic device 1501 includes, for example, the contact information of the calling electronic device 1100, the contact information of the first called electronic device 1200, information indicating that the calling electronic device 1100 originates the call, information indicating that the first called electronic device 1200 forwards the call, and information indicating that the electronic device 1501 receives the forwarded call.

Meanwhile, according to an embodiment, if the server 1508 of FIG. 15 is the server 2000 of FIG. 1, the server 1508 may perform the operations of the server 2000 of FIGS. 1 through 14.

In this case, the server 1508 may receive the first SIP invite message from the calling electronic device 1100, and transmit the first SIP invite message to the first called electronic device 1200.

The server 1508 may receive the response message including the contact information from the first called electronic device 1200, and transmit the received response message to the calling electronic device 1100.

The server 1508 may generate the second SIP invite message including the contact information. The second SIP invite message may be a SIP invite message to be transmitted from the server 1508 to the second called electronic device 1300 for the call forwarding. The server 1508 may obtain the contact information from the response message received from the first called electronic device 1200, and generate the second SIP invite message including the contact information using at least a part of the obtained contact information.

The second SIP invite message including the contact information includes, for example, the 'Via' header, the 'From' header, the 'To' header, the 'Call-ID' header, the 'CSeq' header, the 'Contact' header, the 'Content-length' header and the 'Call-info' header. The server 1508 may generate the second SIP invite message including the contact information, by adding a separate header where the contact information is recorded, to the second SIP invite message. For example, the server 1508 generates the second SIP invite message including the contact information by adding to the second SIP invite message the 'Call-info' header recording the contact information. In this case, the second SIP invite message generated by the server 1508 may include, as the value corresponding to the 'Call-info' header, the contact information of the calling electronic device 1100, the contact information of the first called electronic device 1200 and the contact information of the second called electronic device 1300.

For example, the server 1508 generates the second SIP invite message further including the call blocking information. The call blocking information may include the value indicating whether the call from the calling electronic device 1100 is blocked by the first called electronic device 1200. In this case, the second SIP invite message may include, as the value corresponding to the 'Call-info' header, the call blocking information indicating whether the calling electronic device 1100 is blocked.

The server 1508 may transmit the second SIP invite message to the second called electronic device 1300.

The server 1508 may receive the SIP response code (e.g., 200 OK) from the second called electronic device 1300, and transmit the SIP response code (e.g., 200 OK) to the calling electronic device 1100. The SIP response code (e.g., 200 OK) may request the call connection with the calling electronic device 1100.

The server 1508 may generate the call forwarding history information. The call forwarding history information generated by the server 1508 may include, for example, the contact information of the calling electronic device 1100, the contact information of the first called electronic device 1200, the contact information of the second called electronic device 1300, the information indicating that the calling electronic device 1100 originates the call, the information indicating that the first called electronic device 1200 forwards the call, and the information indicating that the second called electronic device 1300 receives the forwarded call.

The electronic device according to various embodiments disclosed in the disclosure may be a device of various types. The electronic devices includes, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit technological features disclosed in this document to particular embodiments, and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include one, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in various embodiments of the disclosure may include a unit implemented in hardware, software or firmware, and may be interchangeably used with other term, for example, logic, a logic block, a part, or circuitry. The module may be a single integral component, or a minimum unit or part thereof, for performing one or more functions. For example, according to an embodiment, the module may be implemented in a form of an application-specific integrated circuit (ASIC).

Various embodiments of the disclosure may be implemented as software (e.g., the program 1540) including one or more instructions which are stored in a storage medium (e.g., the internal memory 1536 or the external memory 1538) readable by a machine (e.g., the electronic device 1501). For example, a processor (e.g., the processor 1520) of the machine (e.g., the electronic device 1501) invokes at least one of the one or more instructions stored in the storage medium, and execute it or them. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, 'non-transitory' simply means that the storage medium is a tangible device, and does not include a signal (e.g., an electromagnetic wave), but this term does not differentiate between a case where data is semi-permanently stored in the storage medium and a case where the data is temporarily stored.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) directly or online via an application store (e.g., Play Store™), or between two user devices (e.g., smart phones). If distributed online, at least part of the computer program product may be temporarily stored in the machine-readable storage medium such as a memory of a manufacturer's server, a server of the application store, or a relay server, or may be temporarily generated.

According to various embodiments, each component (e.g., a module or a program) of the above-described components may include a single entity or multiple entities, and some of the multiple entities may be separately deployed in different components. According to various embodiments, one or more component or operations of the above-described components may be omitted, or one or more other components or operations may be added. Alternatively or additionally, a plurality of components (e.g., modules or programs) may be integrated as a single component. In this case, the integrated component may perform one or more functions of each component of the plurality of components in the same or similar manner as they are performed by a corresponding component of the plurality of components before the integration. According to various embodiments, operations performed by the module, the program, or other component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first electronic device for forwarding a call from a second electronic device to third electronic device, the first electronic device comprising:
   a transceiver;
   memory storing instructions; and
   one or more processors configured to execute the instructions to:
      receive from a server a first session initiation protocol (SIP) invite message generated at the second electronic device, through the transceiver,
      determine whether to forward the call from the second electronic device, in response to receiving the first SIP invite message,
      upon determining to forward the call from the second electronic device, obtain contact information related to the call forwarding from the second electronic device, wherein the contact information includes a user name of the second electronic device and obtained from a phonebook of a user of the first electronic device,
      generate a response message comprising the contact information related to the call forwarding, and
      transmit the response message to the server having provided the first SIP message for providing the response message comprising the contact information from the server to the second electronic device through the transceiver,
   wherein the contact information in the response message transmitted to the server is used by the server to generate a second SIP invite message to be transmitted to the third electronic device.

2. The first electronic device of claim 1, wherein the one or more processors is further configured to execute the instructions to:
   identify whether the call from the second electronic device is blocked, and generate call blocking information indicating whether the call from the second electronic device is blocked.

3. The first electronic device of claim 2, wherein the one or more processors is further configured to execute the instructions to:
generate the response message comprising the contact information related to the call forwarding and the call blocking information.

4. The first electronic device of claim 3,
wherein the contact information related to the call forwarding comprises contact information of the second electronic device, contact information of the first electronic device, and contact information of the third electronic device, and
wherein the call blocking information comprises an identifier that indicates whether the call from the second electronic device is blocked by the first electronic device.

5. The first electronic device of claim 4, wherein, based on the contact information related to the call forwarding in the response message provided to the second electronic device, a graphical user interface (GUI) guiding that the call is forwarded by the first electronic device to the third electronic device is displayed on an outgoing call screen of the second electronic device.

6. The first electronic device of claim 2, wherein the second SIP invite message comprises the contact information and the call blocking information of the response message transmitted to the server.

7. The first electronic device of claim 6, wherein, based on the contact information in the second SIP invite message provided to the third electronic device, a GUI guiding that the call is forwarded by the first electronic device to the third electronic device is displayed on an incoming call screen of the third electronic device.

8. The first electronic device of claim 6, wherein, based on the call blocking information in the second SIP invite message, the call forwarded to the third electronic device is ignored by the third electronic device.

9. The first electronic device of claim 1, wherein the one or more processors is further configured to execute the instructions to:
generate history information of the call forwarding.

10. The first electronic device of claim 9, wherein the history information of the call forwarding comprises contact information of the second electronic device, contact information of the third electronic device, information indicating that the second electronic device originates the call, information indicating that the first electronic device forwards the call, and information indicating that the third electronic device receives the forwarded call.

11. A method at a first electronic device for forwarding a call from a second electronic device to third electronic device, the method comprising:
receiving from a server a first session initiation protocol (SIP) invite message generated at the second electronic device through a transceiver of the first electronic device;
determining whether to forward the call from the second electronic device, in response to receiving the first SIP invite message;
upon determining to forward the call from the second electronic device, obtaining contact information related to the call forwarding from the second electronic device, wherein the contact information includes a user name of the second electronic device and obtained from a phonebook of a user of the first electronic device;
generating a response message comprising the contact information related to the call forwarding; and
transmitting the response message to the server having provided the first SIP message for providing the response message comprising the contact information from the server to the second electronic device through the transceiver of the first electronic device,
wherein the contact information in the response message transmitted to the server is used by the server to generate a second SIP invite message to be transmitted to the third electronic device.

12. The method of claim 11, further comprising:
identifying whether the call from the second electronic device is blocked; and
generating call blocking information indicating whether the call from the second electronic device is blocked.

13. The method of claim 12, wherein generating the response message comprises:
generating the response message comprising the contact information related to the call forwarding and the call blocking information.

14. The method of claim 13,
wherein the contact information related to the call forwarding comprises contact information of the second electronic device, contact information of the first electronic device, and contact information of the third electronic device, and
wherein the call blocking information comprises an identifier that indicates whether the call from the second electronic device is blocked by the first electronic device.

15. The method of claim 14, wherein, based on the contact information related to the call forwarding in the response message provided to the second electronic device, a graphical user interface (GUI) guiding that the call is forwarded by the first electronic device to the third electronic device is displayed on an outgoing call screen of the second electronic device.

16. The method of claim 12, wherein the second SIP invite message comprises the contact information and the call blocking information of the response message transmitted to the server.

17. The method of claim 16, wherein, based on the contact information in the second SIP invite message provided to the third electronic device, a GUI guiding that the call is forwarded by the first electronic device to the third electronic device is displayed on an incoming call screen of the third electronic device.

18. The method of claim 16, wherein, based on the call blocking information in the second SIP invite message, the call forwarded to the third electronic device is ignored by the third electronic device.

19. The method of claim 11, further comprising:
generating history information of the call forwarding.

20. One or more non-transitory computer-readable recording media storing one or more computer programs including computer-executable instructions that, when executed by one or more processors, cause a first electronic device to perform operations, the operations comprising:
receiving from a server a first session initiation protocol (SIP) invite message generated at a second electronic device through a transceiver of the first electronic device;
determining whether to forward a call from the second electronic device, in response to receiving the first SIP invite message;

upon determining to forward the call from the second electronic device, obtaining contact information related to the call forwarding from the second electronic device, wherein the contact information includes a user name of the second electronic device and obtained from a phonebook of a user of the first electronic device;

generating a response message comprising the contact information related to the call forwarding; and transmitting the response message to the server having provided the first SIP message for providing the response message comprising the contact information from the server to the second electronic device through the transceiver of the first electronic device, wherein the contact information in the response message transmitted to the server is used by the server to generate a second SIP invite message to be transmitted to a third electronic device.

\* \* \* \* \*